United States Patent

Moratalla et al.

[11] Patent Number: 5,572,987
[45] Date of Patent: Nov. 12, 1996

[54] SOLAR ENERGY SYSTEM

[76] Inventors: Jose M. Moratalla, P.O. Box 2603, Dunedin, Fla. 34697-2603; Robert W. Yoho, 5812 Toucan Pl., Clearwater, Fla. 34620; Richard L. Glueck, 1102 62nd St., South Pasadena Estates, Fla. 33707

[21] Appl. No.: 276,449

[22] Filed: Jul. 18, 1994

[51] Int. Cl.⁶ .................................................. F24J 2/50
[52] U.S. Cl. .......................... 126/652; 126/658; 126/670
[58] Field of Search ................................ 126/652, 651, 126/653, 670, 658, 657, 656, 655

[56] References Cited

U.S. PATENT DOCUMENTS

| | | | |
|---|---|---|---|
| 3,227,153 | 1/1966 | Godel et al. | 126/652 |
| 4,133,298 | 1/1979 | Hayama | 126/653 |
| 4,307,712 | 12/1981 | Tracy | 126/652 |
| 4,396,005 | 8/1983 | Fehlner et al. | 126/652 |
| 4,470,405 | 9/1984 | Landstrom et al. | 126/652 |

FOREIGN PATENT DOCUMENTS

| | | | |
|---|---|---|---|
| 5665 | 11/1979 | European Pat. Off. | 126/658 |
| 2533019 | 3/1984 | France | 126/652 |
| 63349 | 5/1980 | Japan | 126/652 |
| 52755 | 3/1982 | Japan | 126/652 |
| 47154 | 3/1982 | Japan | 126/652 |
| 198956 | 12/1982 | Japan | 126/652 |
| 63455 | 4/1984 | Japan | 126/652 |

*Primary Examiner*—James C. Yeung

[57] ABSTRACT

A solar energy system having a component comprising a heat absorber which has a tubular conduit. The heat absorber also has a fin for supporting the conduit. The conduit and fin are fabricated of a dark color for collecting solar energy. A housing surrounds the conduit. The housing includes an axially disposed interior member with a cross section greater than the cross section of the conduit. The housing also includes a plurality of axially disposed exterior members. The interior member and the exterior members are fabricated of a transparent material. The invention further includes at least one end cap which is coupled with respect to one end of the interior tube which has at least one aperture in the end cap.

19 Claims, 27 Drawing Sheets

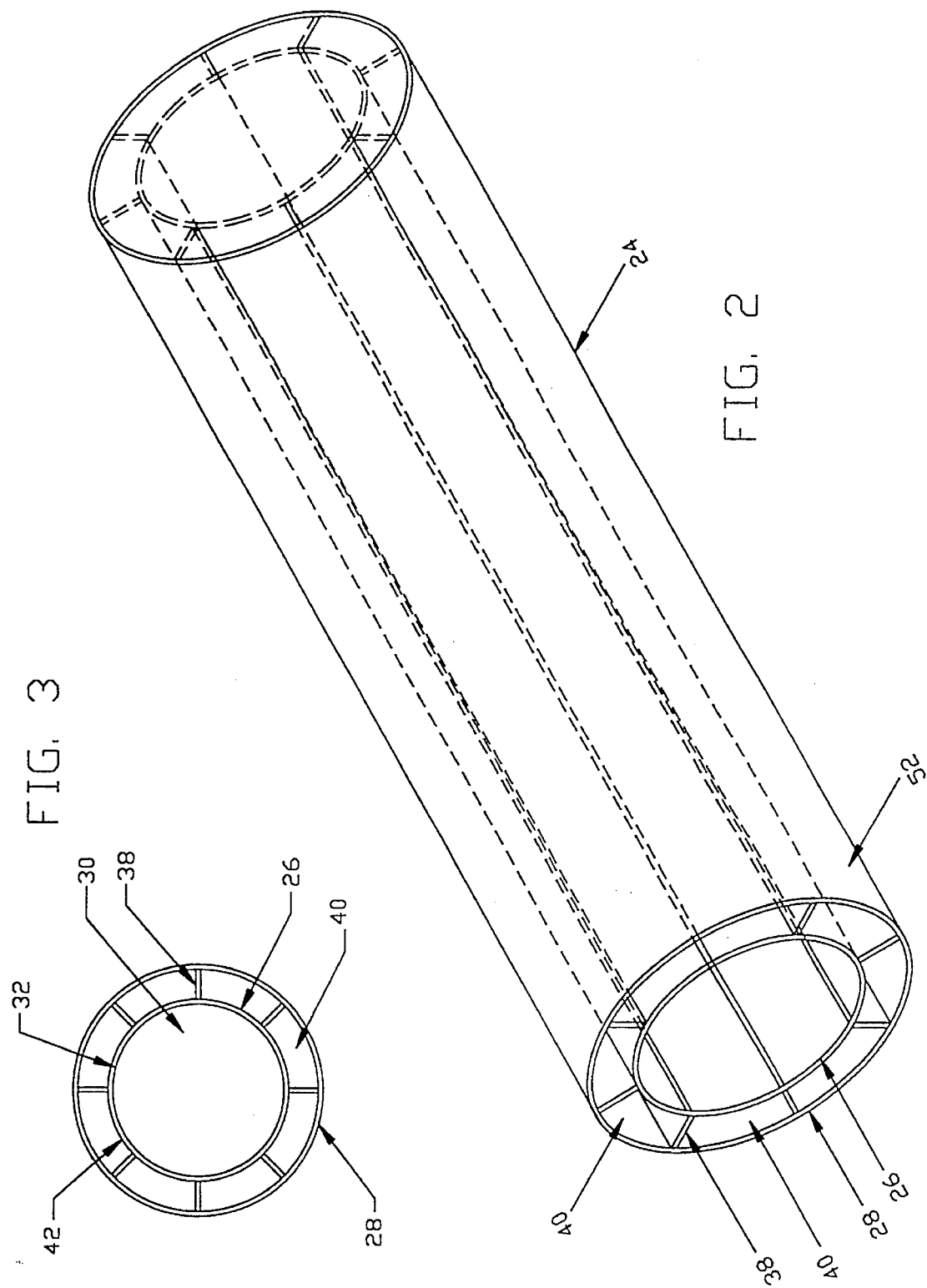

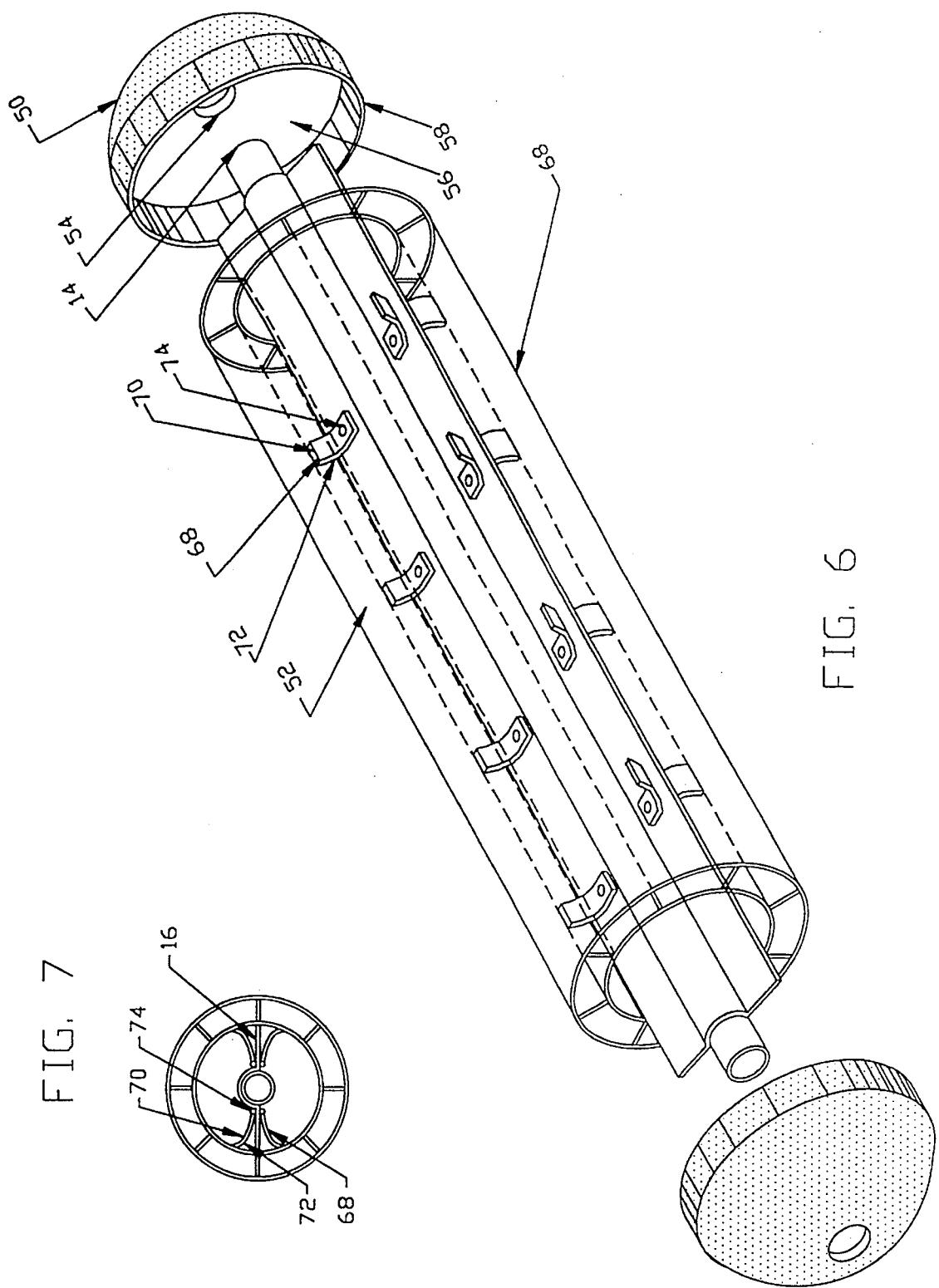

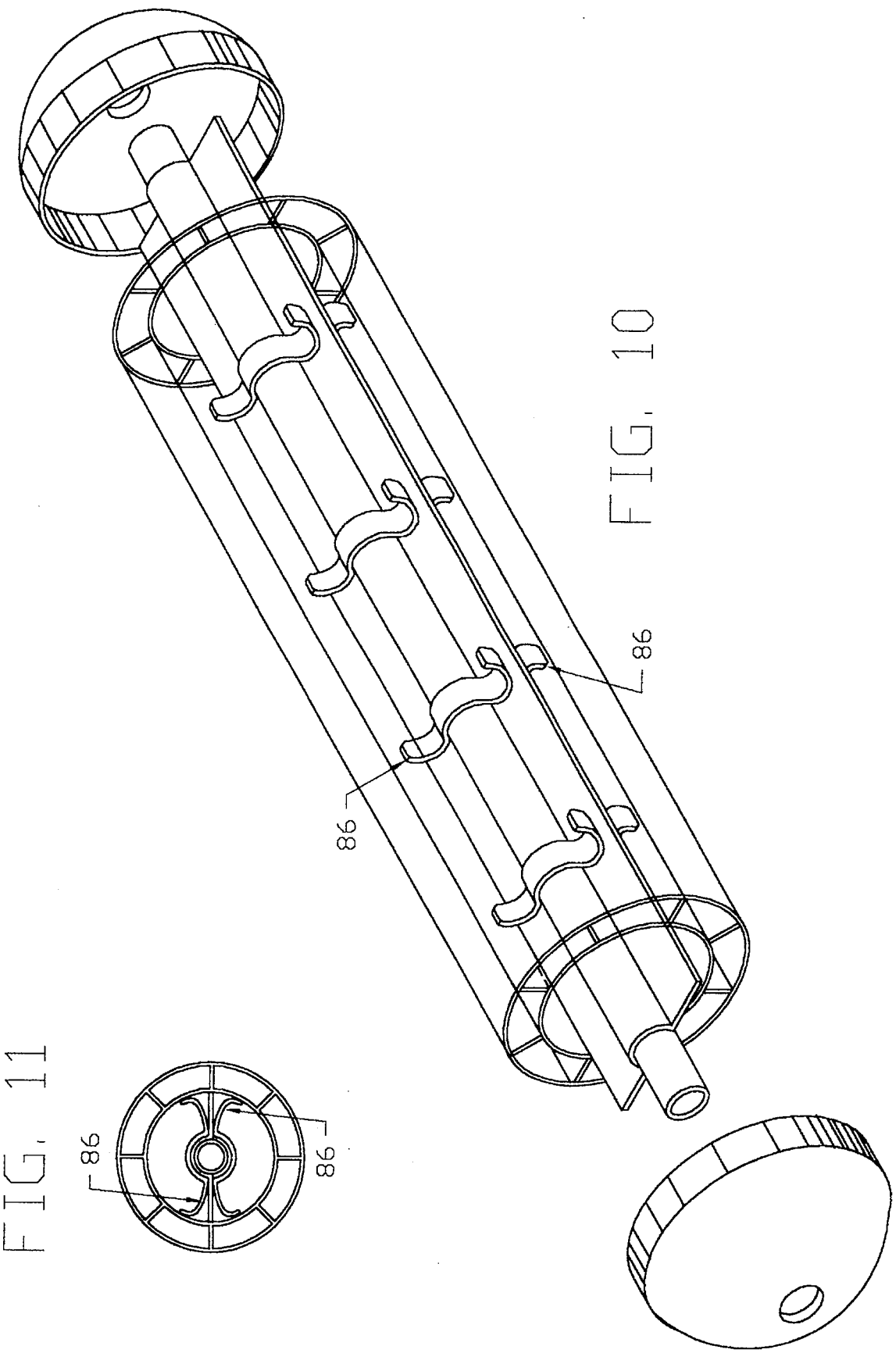

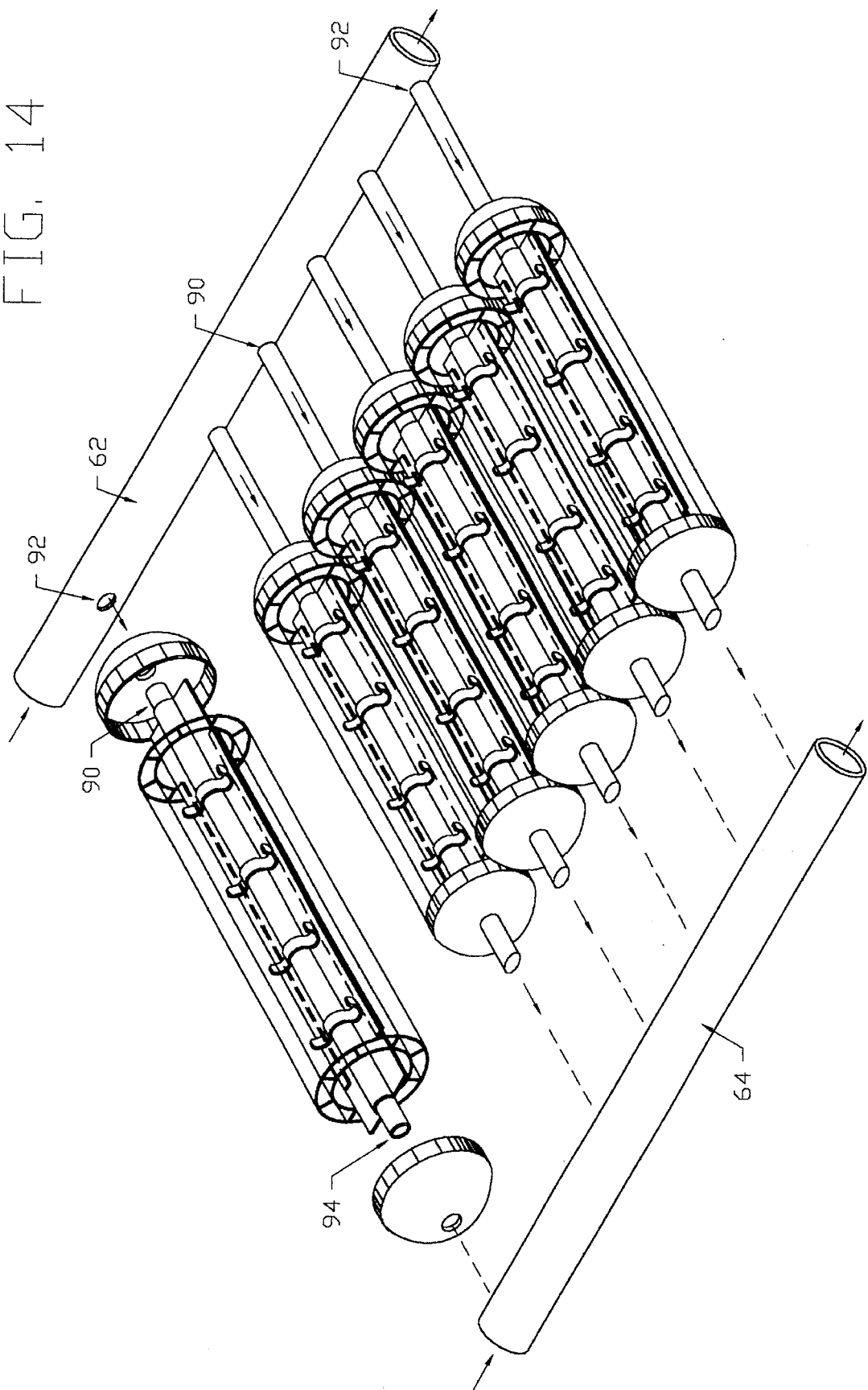

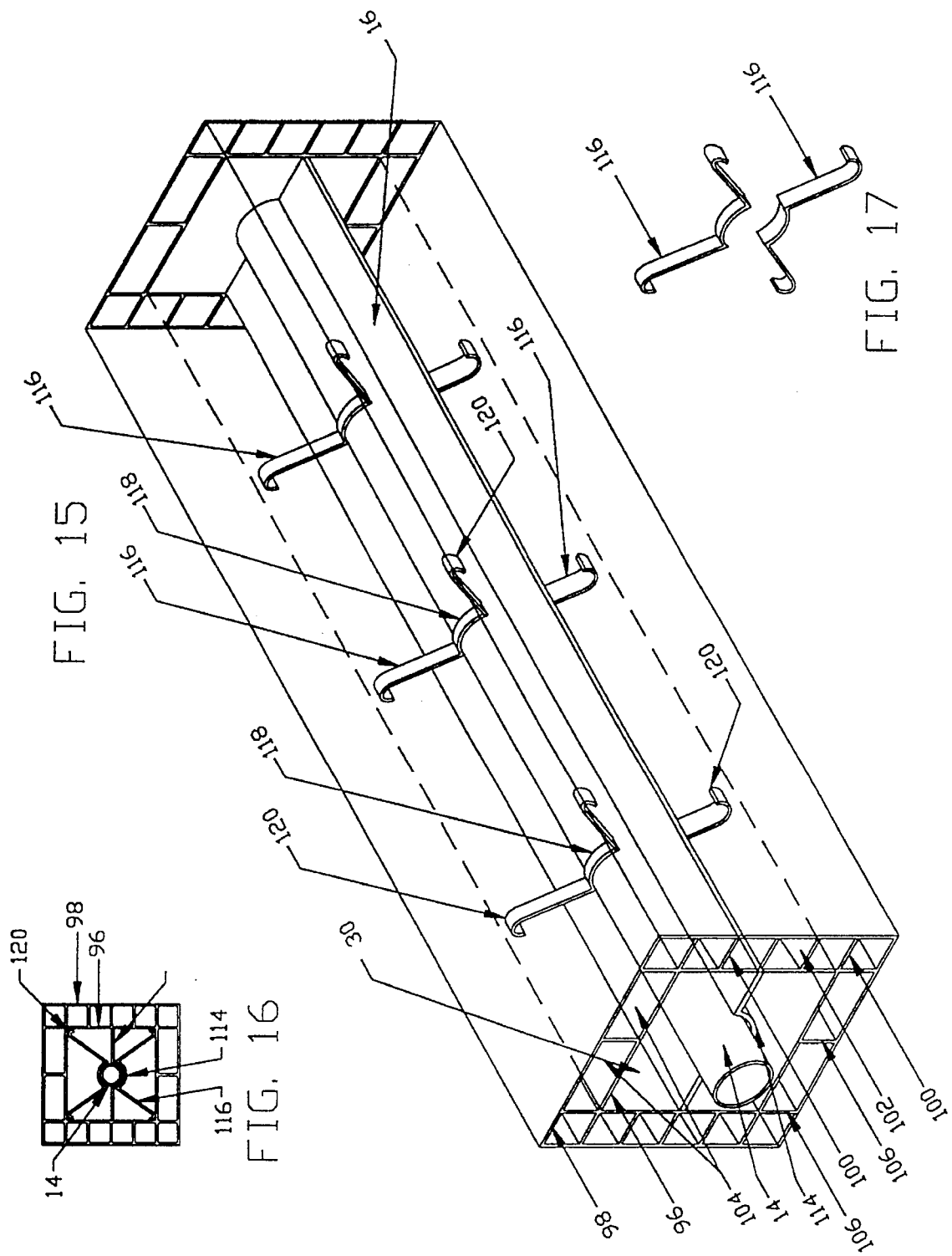

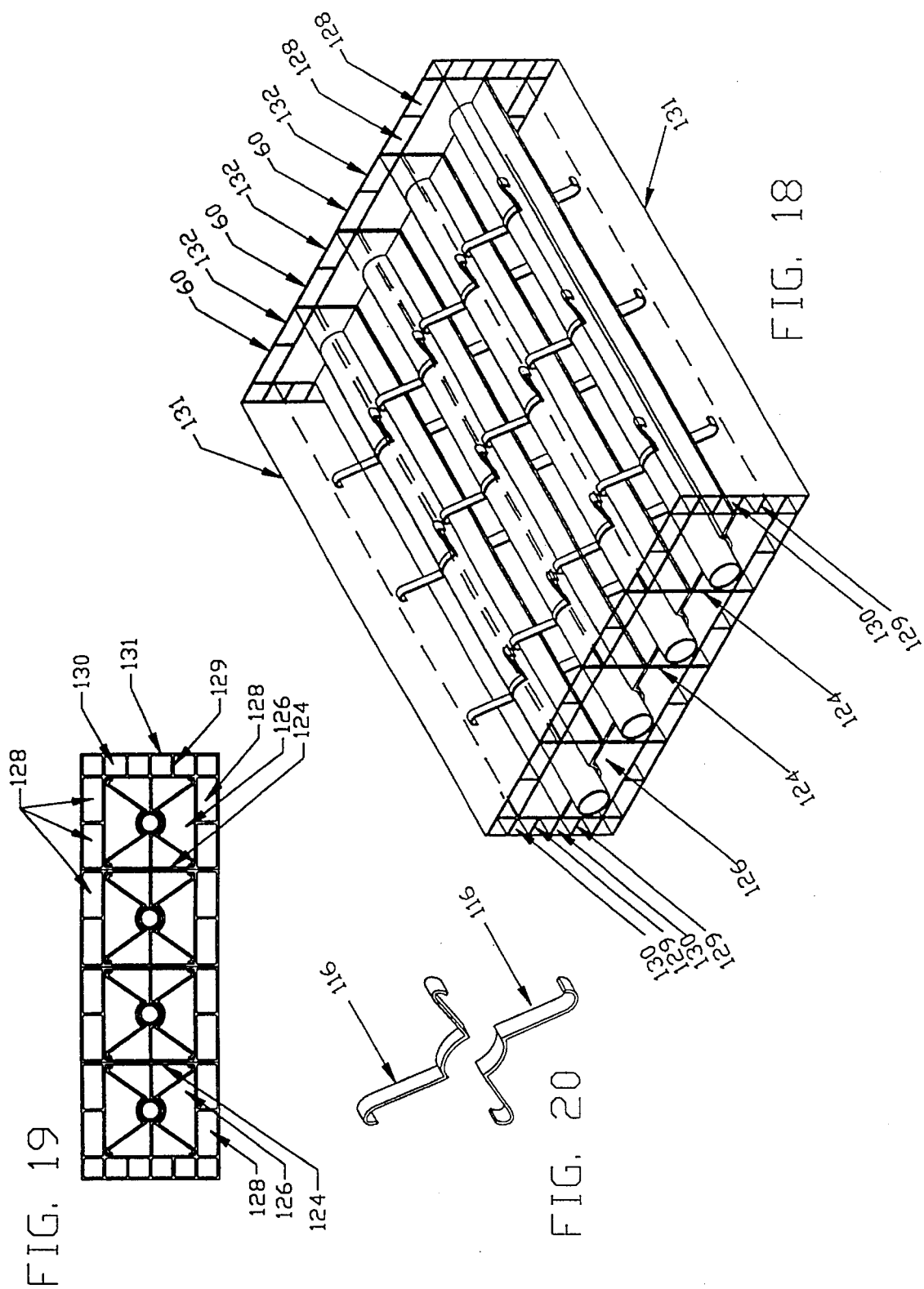

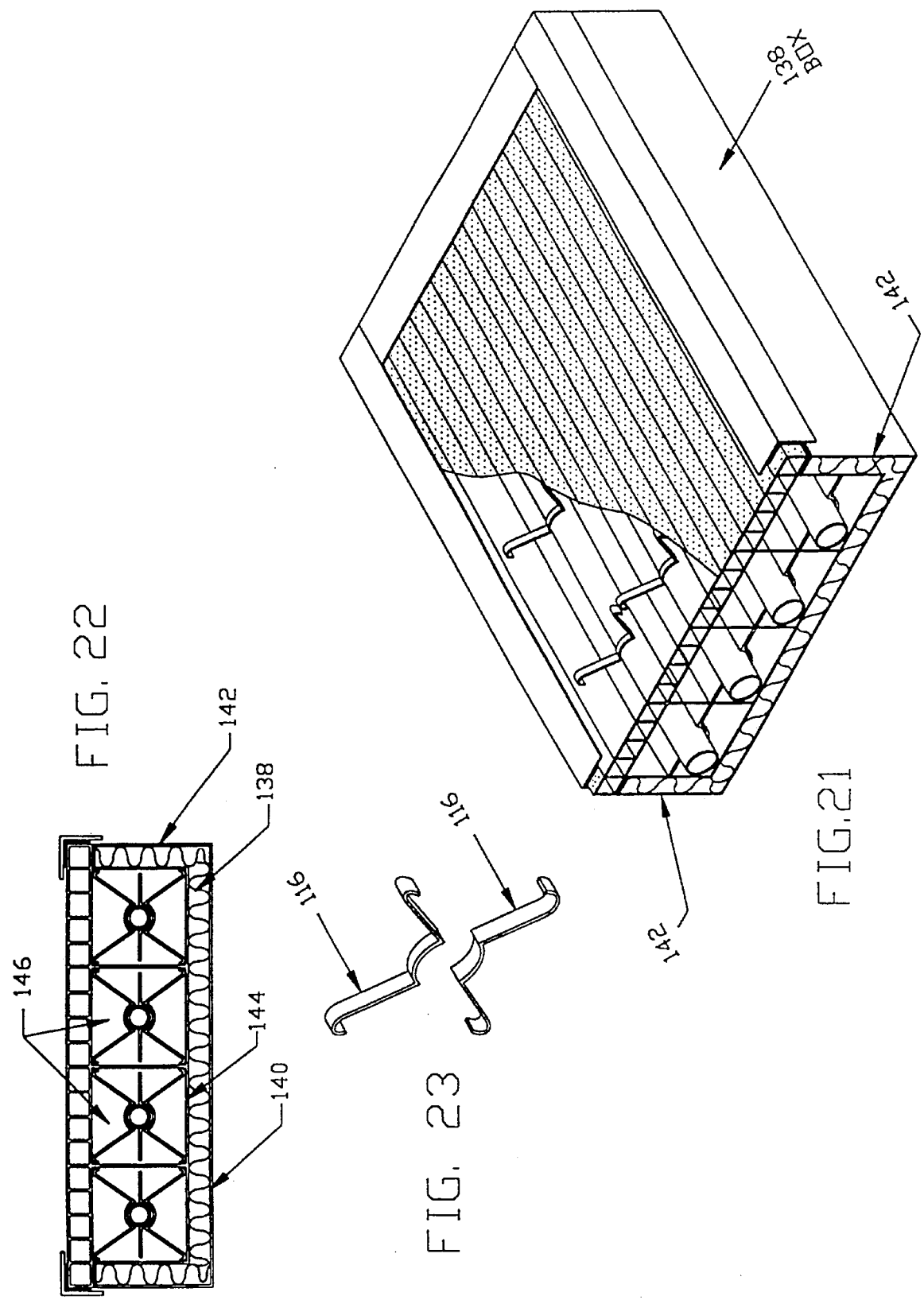

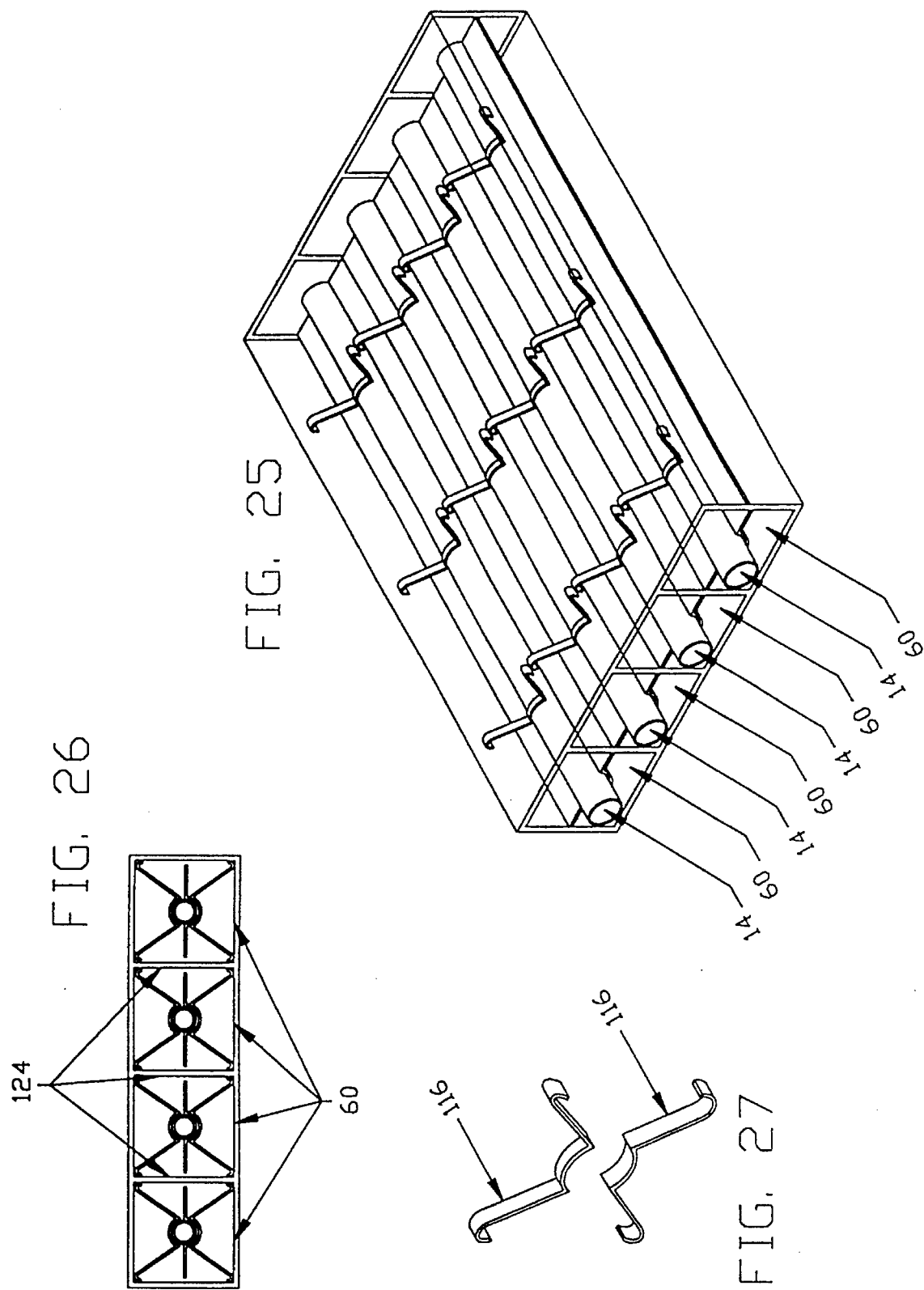

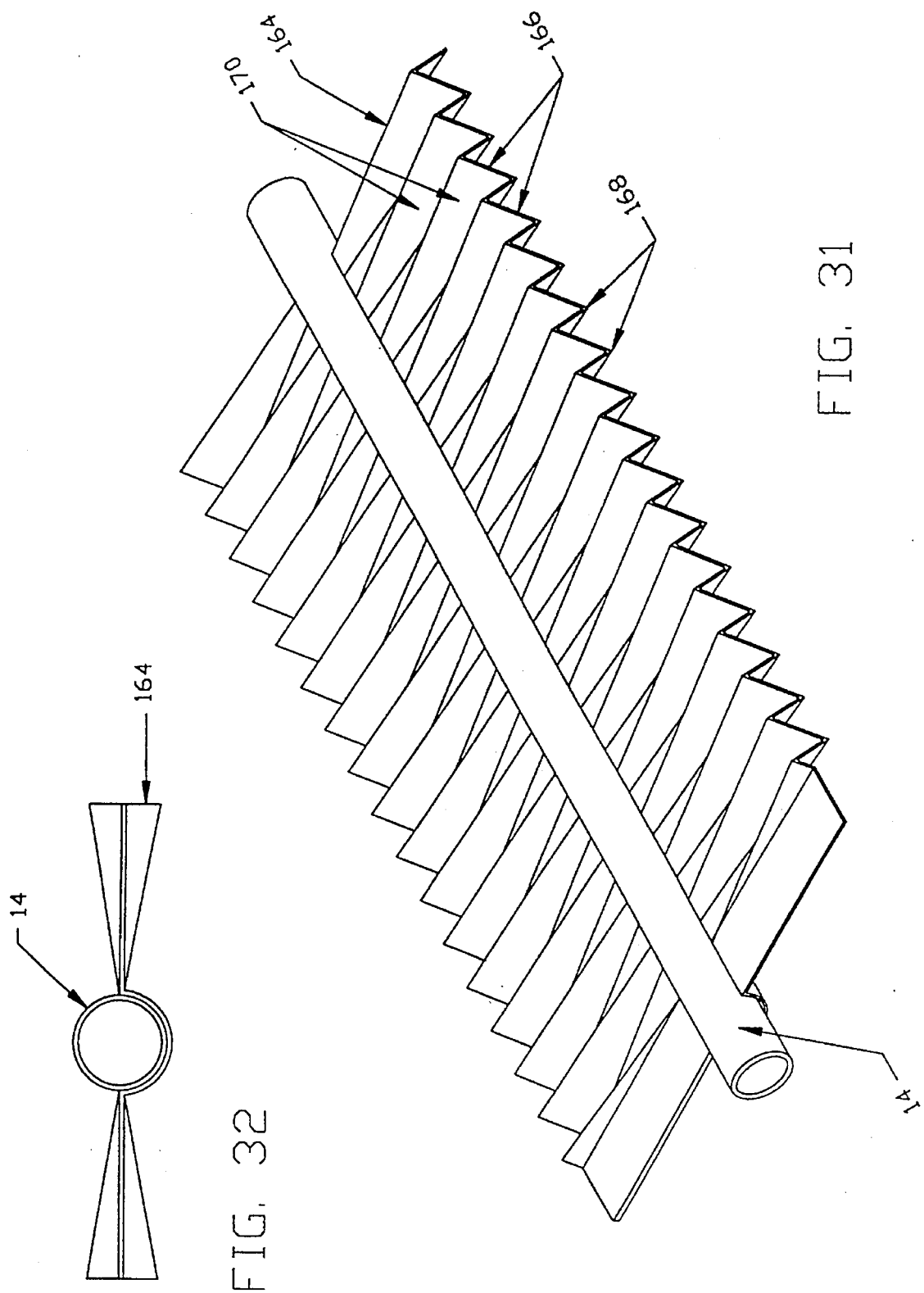

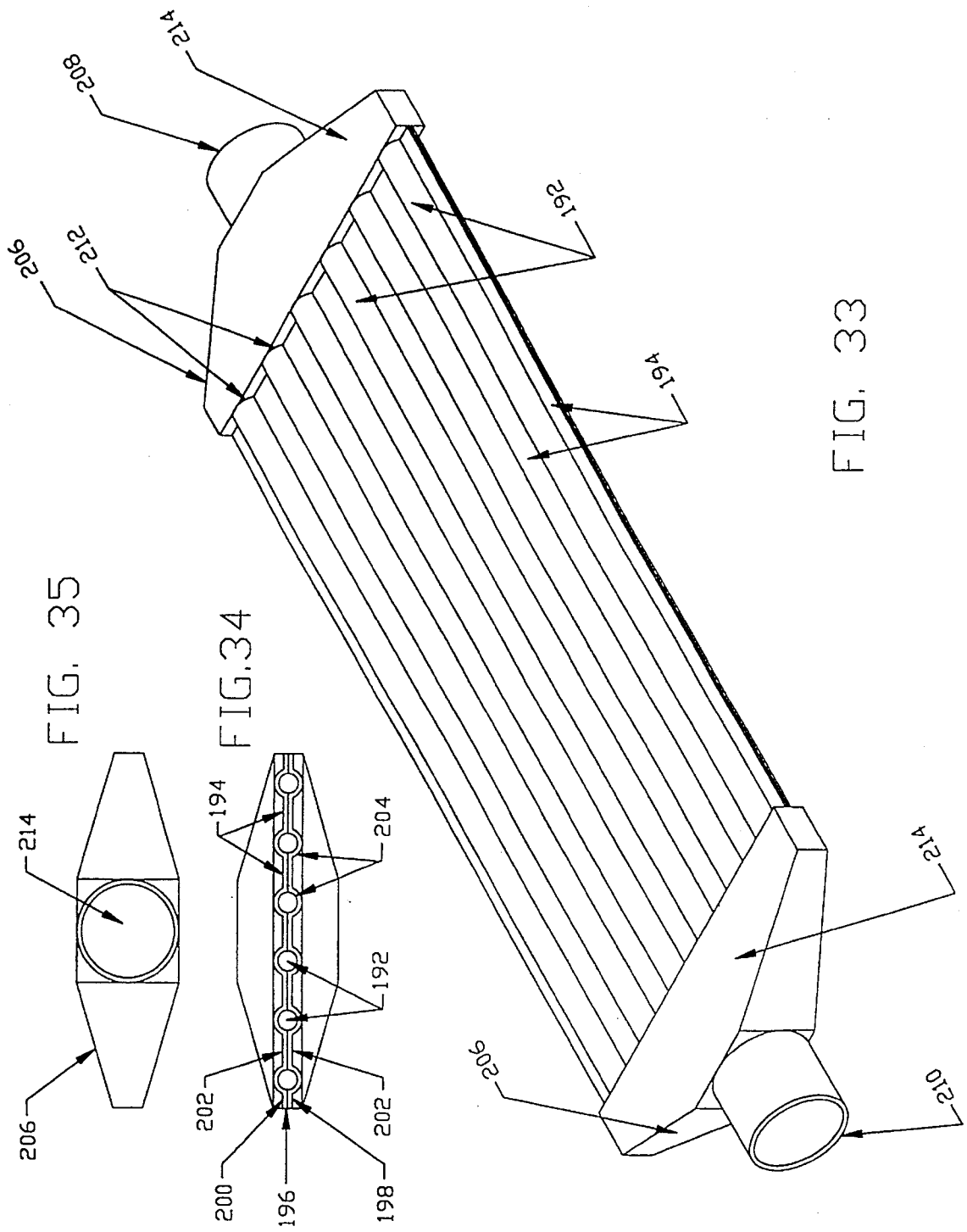

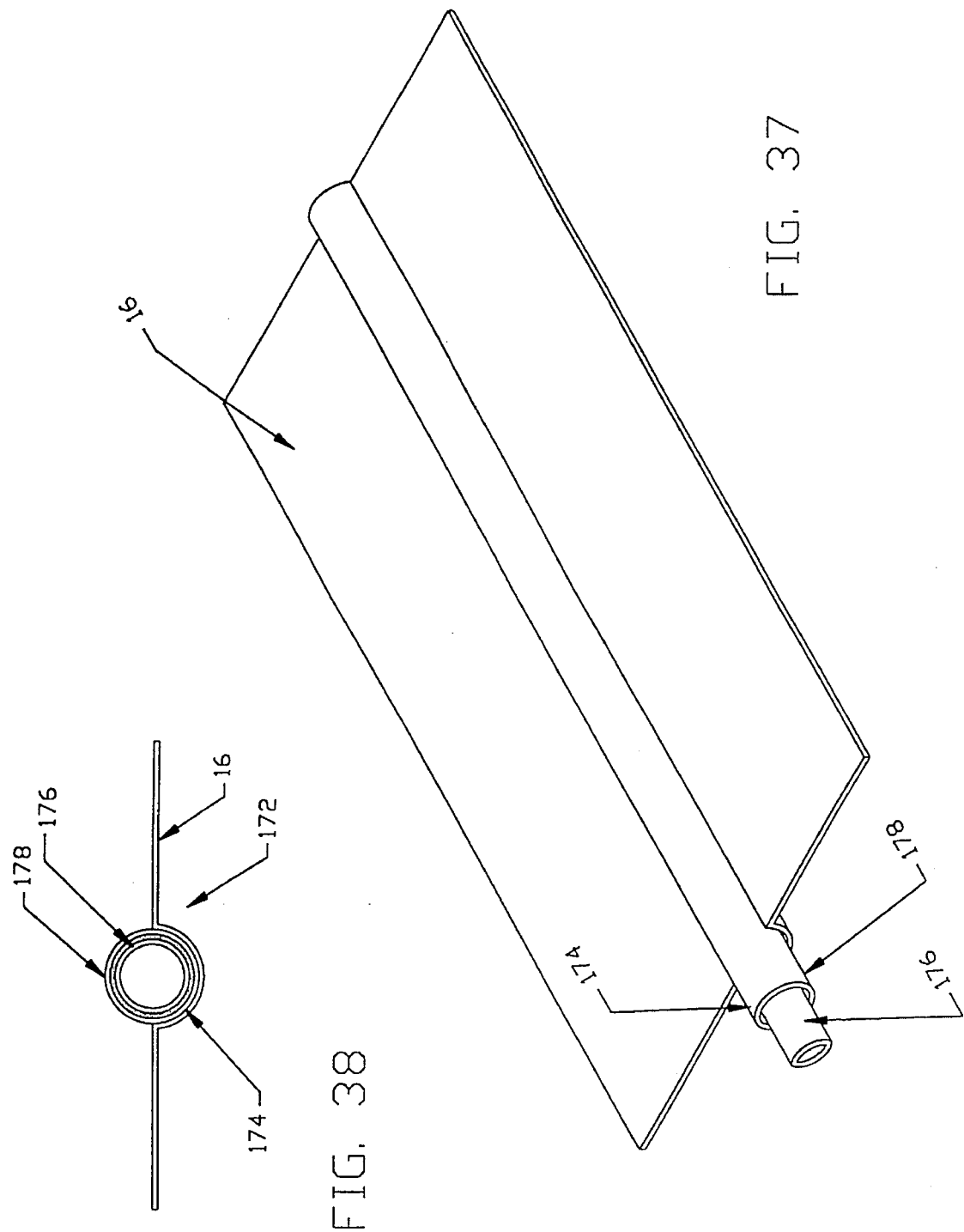

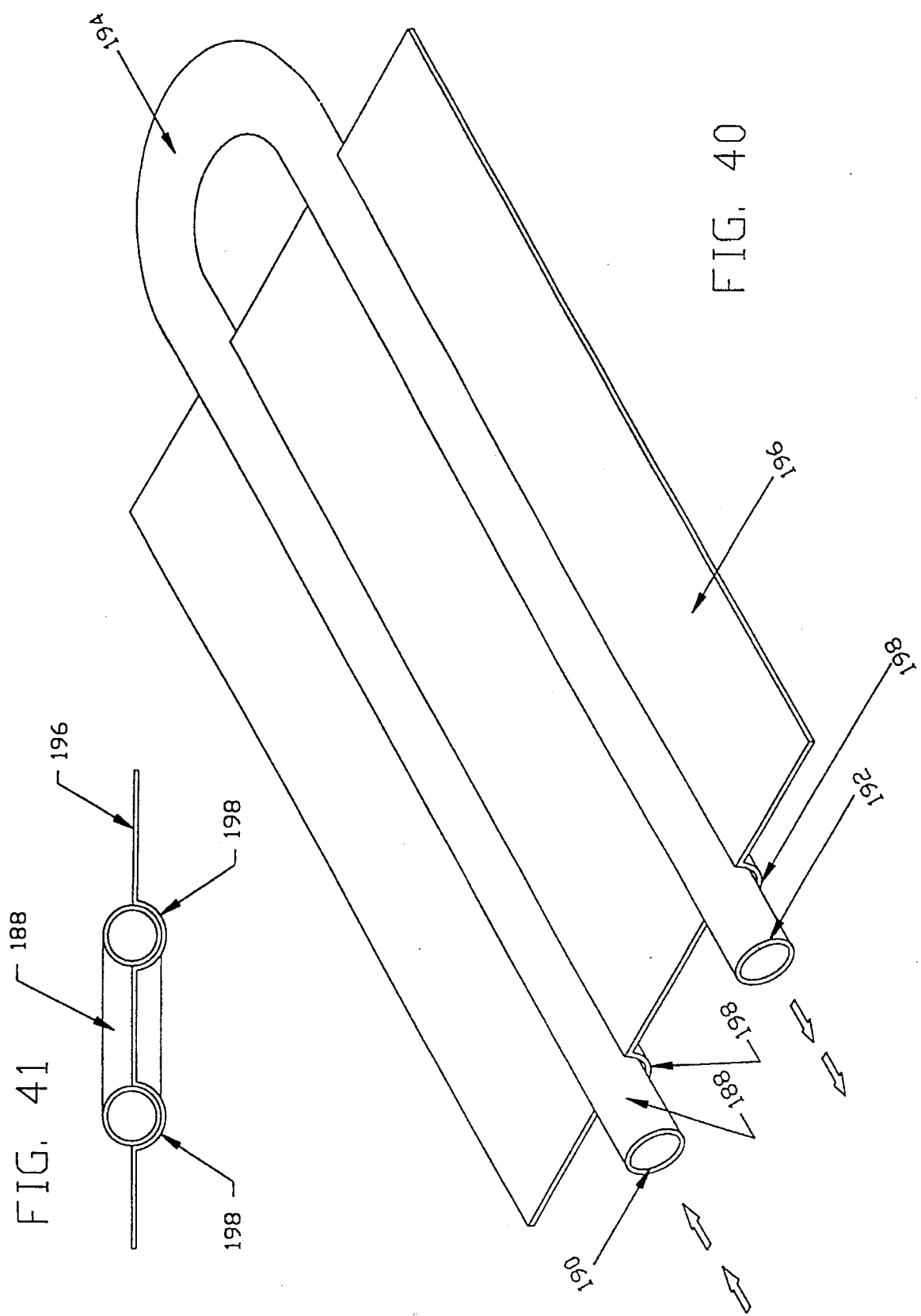

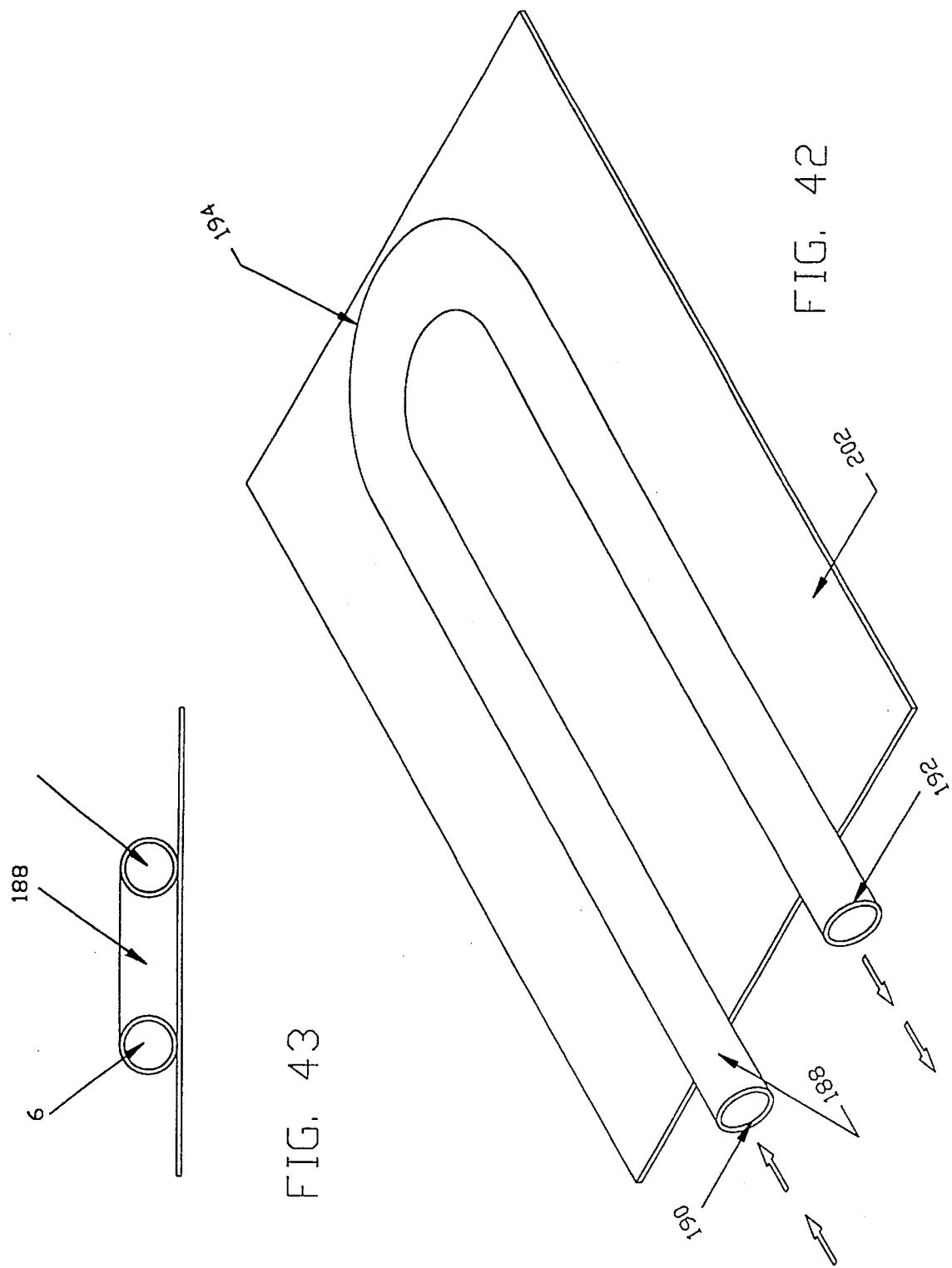

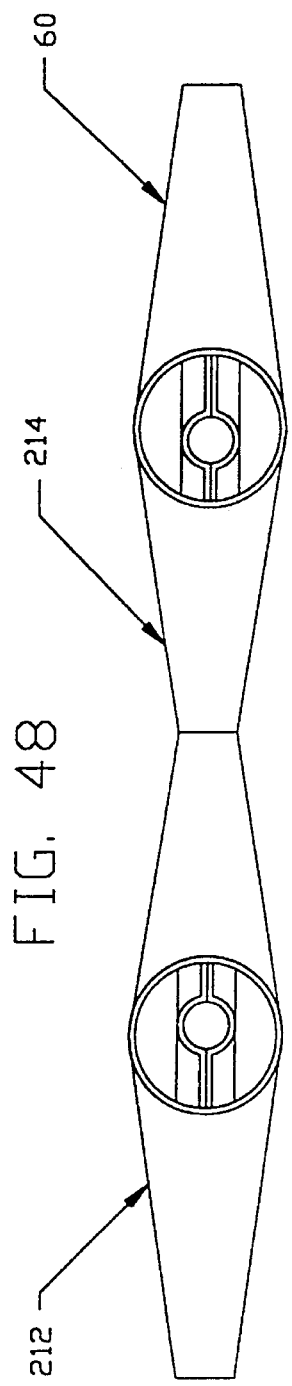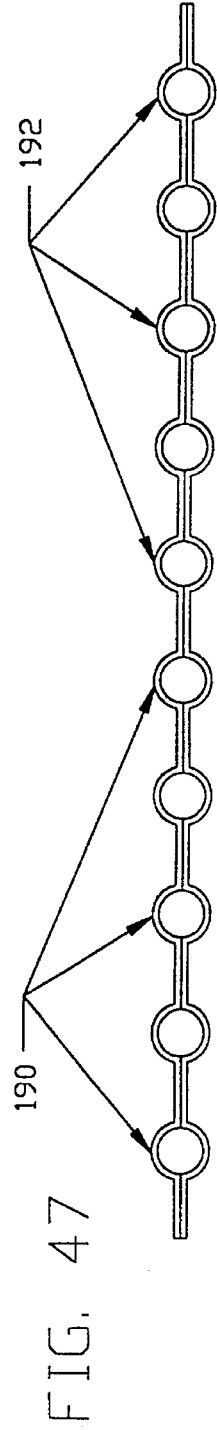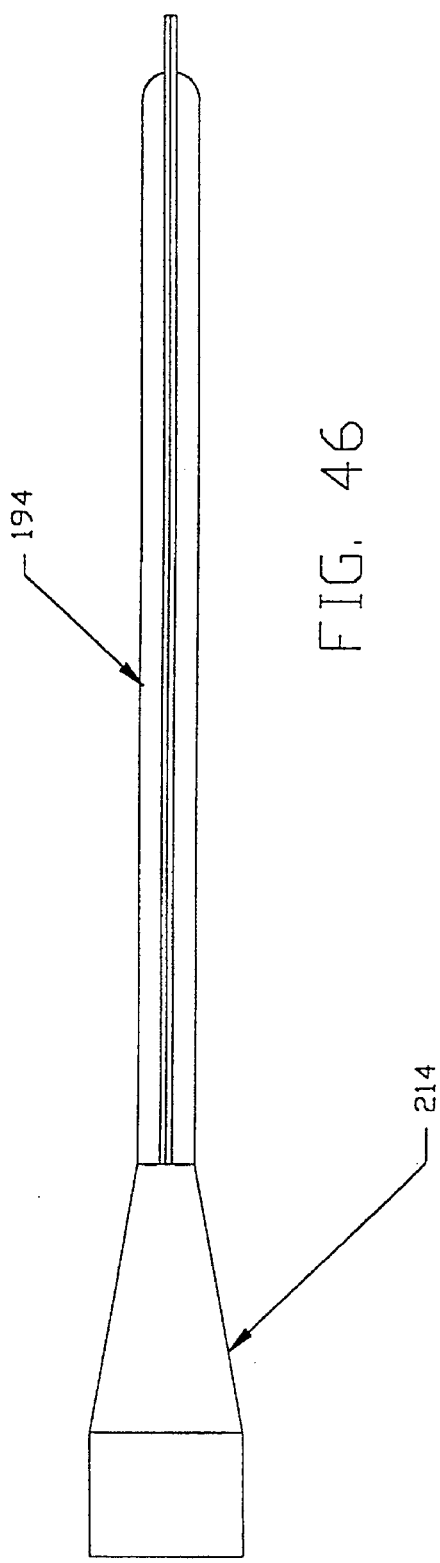

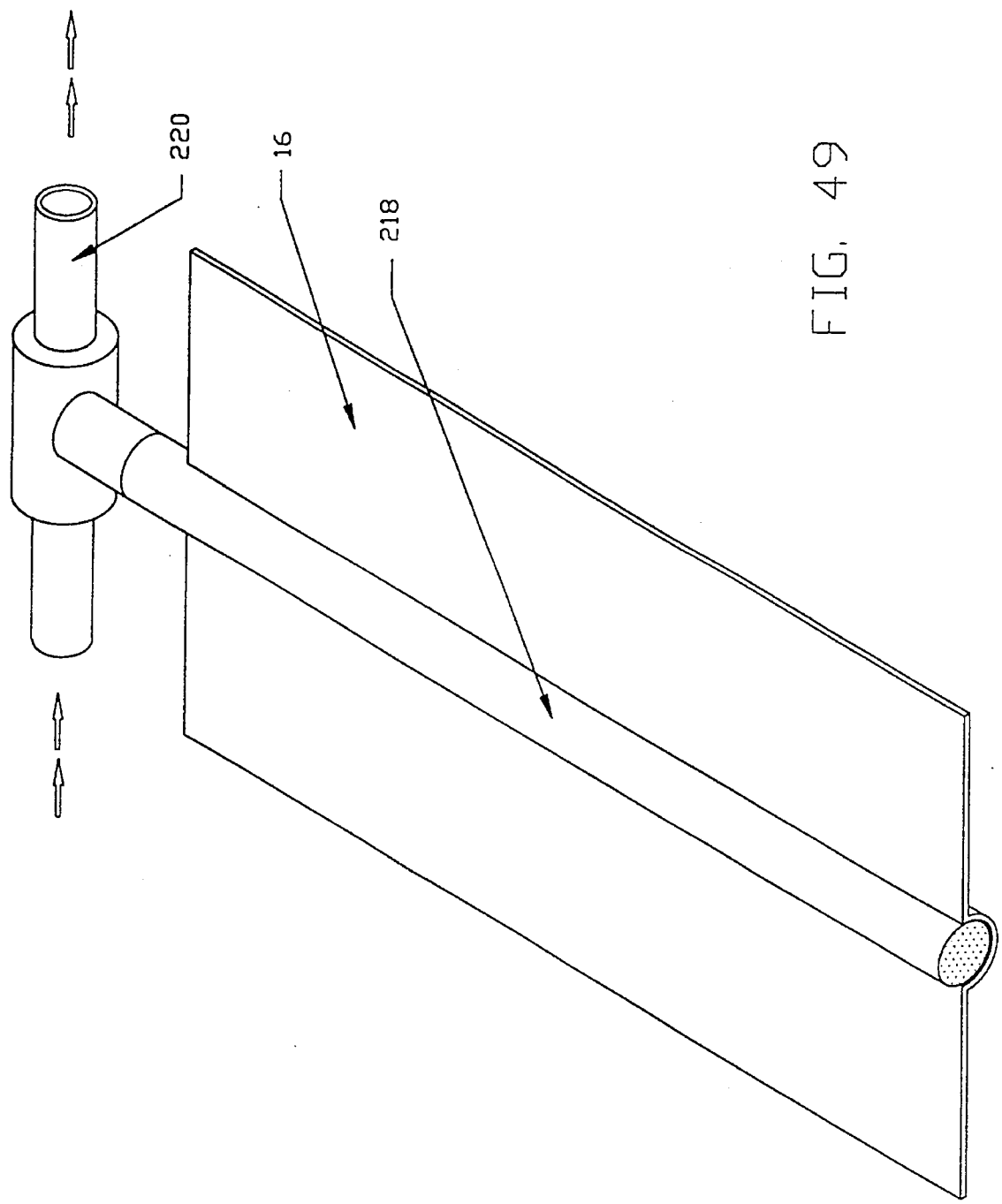

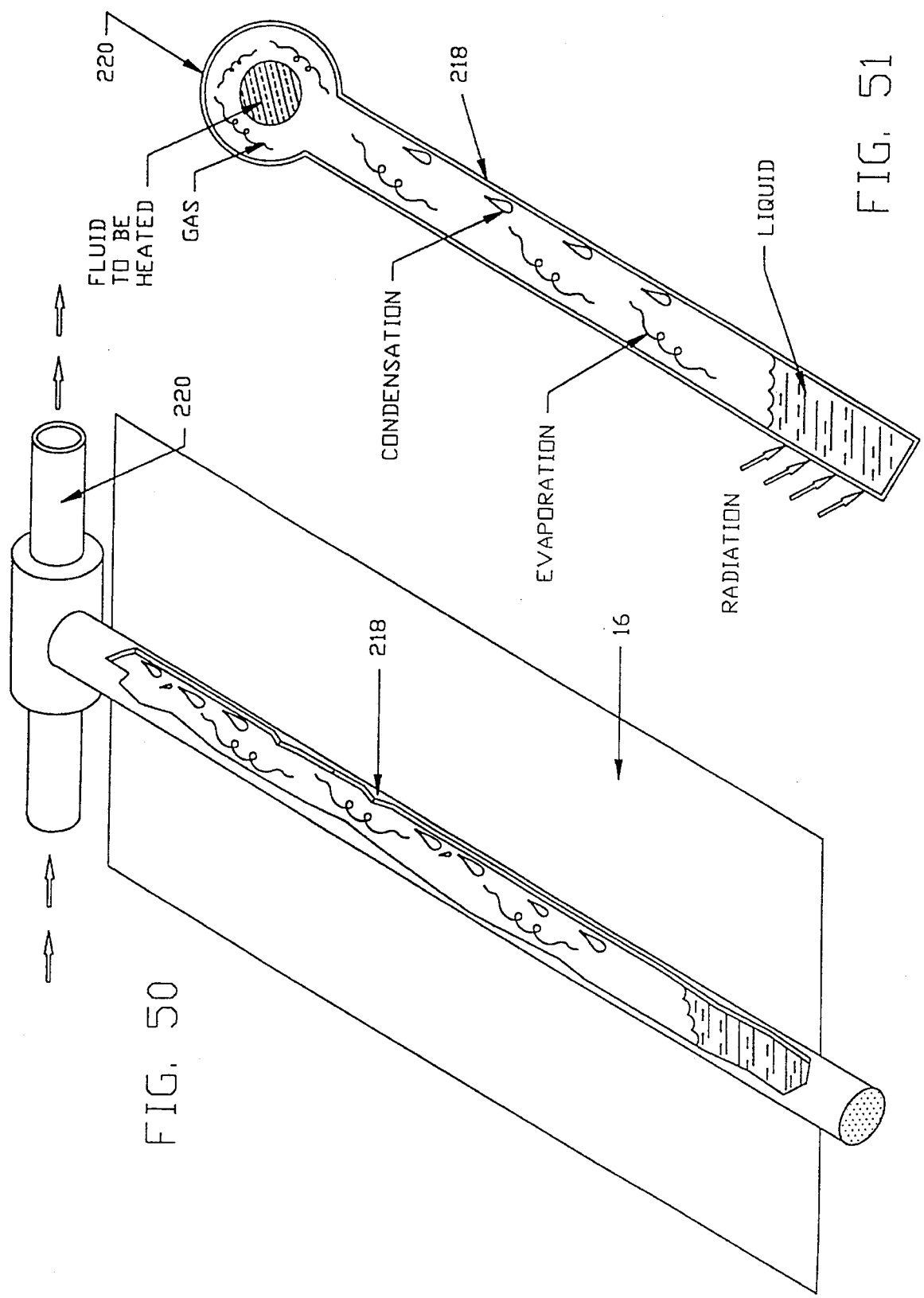

SOLAR ENERGY SYSTEM

BACKGROUND OF THE INVENTION

1. Field of the Invention

This invention relates to a solar energy system and, more specifically, to a conduit provided for conducting a flow of fluid to be heated. The conduit is encased within a housing. The conduit and housing have a common longitudinal axis. The housing is fabricated of an interior heat collecting tube and an exterior heat collecting tube with radial members separating the exterior tube into segments. Alternate embodiments involve variations in the shape of the conduit and the housing as well as a plurality of housings being fabricated through a common extrusion and other fabrication techniques.

2. Description of the Background Art

Presently, there is an ever increasing scarcity of fossil fuels. This has resulted in technical efforts to develop alternative fuel sources as well as new systems for heating and cooling. One promising alternative involves the use of solar energy. A large number of technical proposals have been made for utilizing solar energy. One such proposal involves exposing a liquid to sunlight for increasing the temperature of the liquid. The heat may then be extracted therefrom as a source of energy. The development of a economical and efficient technique for utilizing thermal energy is an important requirement for the implementation of alternatives to fossil energy sources. Objectives in these efforts has been to collect, as much as possible, the radiation from the sun for the lowest possible costs in labor and materials.

Continuing technical efforts are evidenced by the patent literature. By way of example, U.S. Pat. No. 3,983,861 to Beauchaine discloses a solar energy conversion device; U.S. Pat. No. 4,038,964 to Drew discloses a parabolic solar concentrator employing flat plate collector; U.S. Pat. No. 4,091,796 to Bieringer et al discloses a solar energy collection apparatus; U.S. Pat. No. 4,092,979 to Kotlarz discloses a combined solar energy conversion and structural and mechanical beam and structures built therefrom; U.S. Pat. No. 4,124,017 to Paull discloses a collimating solar radiation collector; U.S. Pat. No. 4,141,341 to Eby discloses a solar heating panel; U.S. Pat. No. 4,147,155 to Krafft discloses a device for collecting solar energy; U.S. Pat. No. 4,183,351 to Hinotani et al and U.S. Pat. No. 4,231,353 to Kanatani disclose a solar heat collecting apparatus; U.S. Pat. No. 4,279,242 to Bogatzki discloses a solar collector assembly; U.S. Pat. No. 4,397,304 to Villain discloses a solar sensor equipped with solar energy absorbing member and panel having such sensors; U.S. Pat. No. 4,470,405 to Landstrom et al discloses a method and apparatus for controlling insolation in a building; and U.S. Pat. No. 4,586,489 to Voll et al discloses a semi-concentrating solar energy collector.

All prior art approaches have one inadequacy or another, and nothing in the prior art provides the benefits and advantages of the present invention.

Accordingly, it is an object of this invention to provide an improvement which overcomes the inadequacies of the prior art devices and provides an improvement which is a significant contribution to the advancement of the art.

Another object of this invention is to provide a solar energy system having components comprising a heat absorber, having a tubular conduit, the heat absorber also having a fin for supporting the conduit, the conduit and fin being fabricated of a dark color for collecting solar energy. Further provided is a housing surrounding the conduit, the housing including an axially disposed interior member with a cross section greater than the cross section of the conduit, the housing also including a plurality of axially disposed exterior members, the interior member and the exterior members being fabricated of a transparent material. Further provided is at least one end cap coupled with respect to one end of the interior tube having at least one aperture in the end cap.

It is a further object of the present invention to convert the radiation of the sun into solar energy in a more efficient, convenient and economical manner.

It is a further object of the present invention to convert solar energy to thermal energy in a liquid flowing through a conduit through the black body effect.

It is a further object of the present invention to absorb, confine and retain solar energy adjacent to a conduit for heating water through the use of the green house effect.

It is a further object of the present invention to enclose a conduit conveying fluid to be heated with an interior heat collecting tube and to employ exterior linear segments to the exterior of the tube.

It is a further object of the present invention to extrude the components of a system for converting solar energy to thermal energy in the most efficient, convenient and cost effective manner.

The foregoing has outlined some of the pertinent objects of the invention. These objects should be construed to merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises a new and improved solar energy system, formed from a plurality of components, each component comprising, in combination, a heat absorber having a tubular conduit located in a linear path along at least a central portion of its extent, the tubular conduit having a linear axis extending therethrough, the heat absorber also having a fin with end sections and a central section therebetween for supporting the conduit, the conduit and fin being fabricated of a dark color for collecting solar energy from the sun and transferring such solar energy by the black body effect to a liquid flowing through the conduit. The present invention further comprises an extruded cylindrical housing surrounding the conduit, the cylindrical housing including an interior heat collecting tube with a cross section greater than the cross section of the conduit, the housing also including an exterior heat collecting tube with a cross section greater than the cross section of the interior tube with the exterior tube and the interior tube and the tubular conduit all having a common axis, the interior tube having an interior surface adapted to receive and support the end sections of the fin, the interior tube and the exterior tube being fabricated of a transparent material for the receipt and entrapment of solar energy by the greenhouse effect. The present invention further includes radial spacers located between the interior tube and the exterior tube along the lengths thereof to divide the space between the tubes into axial segments. The invention further includes an end cap coupled with respect to each end of the conduit with apertures in the end caps for the passage of the conduit therethrough.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 2 is a perspective illustration of one housing for the receipt, passage and entrapment of solar energy as employed in the system of FIG. 1.

FIG. 3 is an end elevational view of the housing illustrated in FIGS. 1 and 2.

FIG. 6 is an exploded perspective view of an alternate embodiment of a component, absorber and housing, for use in the system of the type shown in FIG. 1.

FIG. 7 is an end elevational view of the absorber and housing shown in FIG. 6.

FIG. 10 is an exploded perspective view of an alternate embodiment of a component for use in the system of the type shown in FIG. 1.

FIG. 11 is an end elevational view of the absorber and housing shown in FIG. 10.

FIG. 14 is an exploded perspective illustration similar to FIG. 13 but adding the header and footer.

FIG. 15 is a perspective illustration of a component of an alternate embodiment of the invention for use in a system of the type shown in FIG. 1.

FIG. 16 is an end elevational view of the element illustrated in FIG. 15.

FIG. 17 is an exploded perspective view of the clips utilized in association with the component shown in FIGS. 15 and 16.

FIG. 18 is a perspective view of components similar to FIG. 15 but in systems configuration.

FIG. 19 is an end elevational view of the element as illustrated in FIG. 18.

FIG. 20 is an exploded perspective view of the clips utilized in association with the absorber shown in FIGS. 18 and 19.

FIG. 21 is a perspective illustration of components capable of use in any of the prior Figures constructed in accordance with an alternate embodiment of the invention.

FIG. 22 is an end elevational view of the components as illustrated in FIG. 21.

FIG. 23 is an exploded perspective view of the clips utilized in association with the components shown in FIGS. 21 and 22.

FIG. 25 is a perspective illustration of components of an alternate embodiment of the invention for use in a system of the type shown in FIG. 1.

FIG. 26 is an end elevational view of the components as illustrated in FIG. 25.

FIG. 27 is an exploded perspective view of the clips utilized in association with the absorber shown in FIGS. 25 and 26.

FIG. 31 is a perspective illustration of a fin of an alternate embodiment of the invention for use in a system of the type shown in FIG. 1.

FIG. 32 is an end elevational view of the heat absorber shown in FIG. 31.

FIGS. 33, 34 and 35 are a perspective view of an alternate embodiment of the heat absorber as well as an end view of the conduit and an end view of a cap.

FIG. 37 is a perspective view of an absorber configured for two-way flow of fluid.

FIG. 38 is an end elevational view of the heat absorber shown in FIG. 37.

FIGS. 40 and 41 are perspective and end illustrations of an alternate embodiment of a curved conduit.

FIGS. 42 and 43 are a perspective and end illustration of an alternate embodiment of the curved conduit.

FIGS. 46, 47 and 48 are a side view of an alternate embodiment of the heat absorber with an end view of the conduit and an end view of the cap.

FIGS. 49, 50 and 51 are perspective views and a sectional view of an alternate heat absorber utilized as a condensation tube.

Similar reference characters refer to similar parts throughout the several views of the Figures.

DETAILED DESCRIPTION OF THE PREFERRED EMBODIMENT

Figure 1:
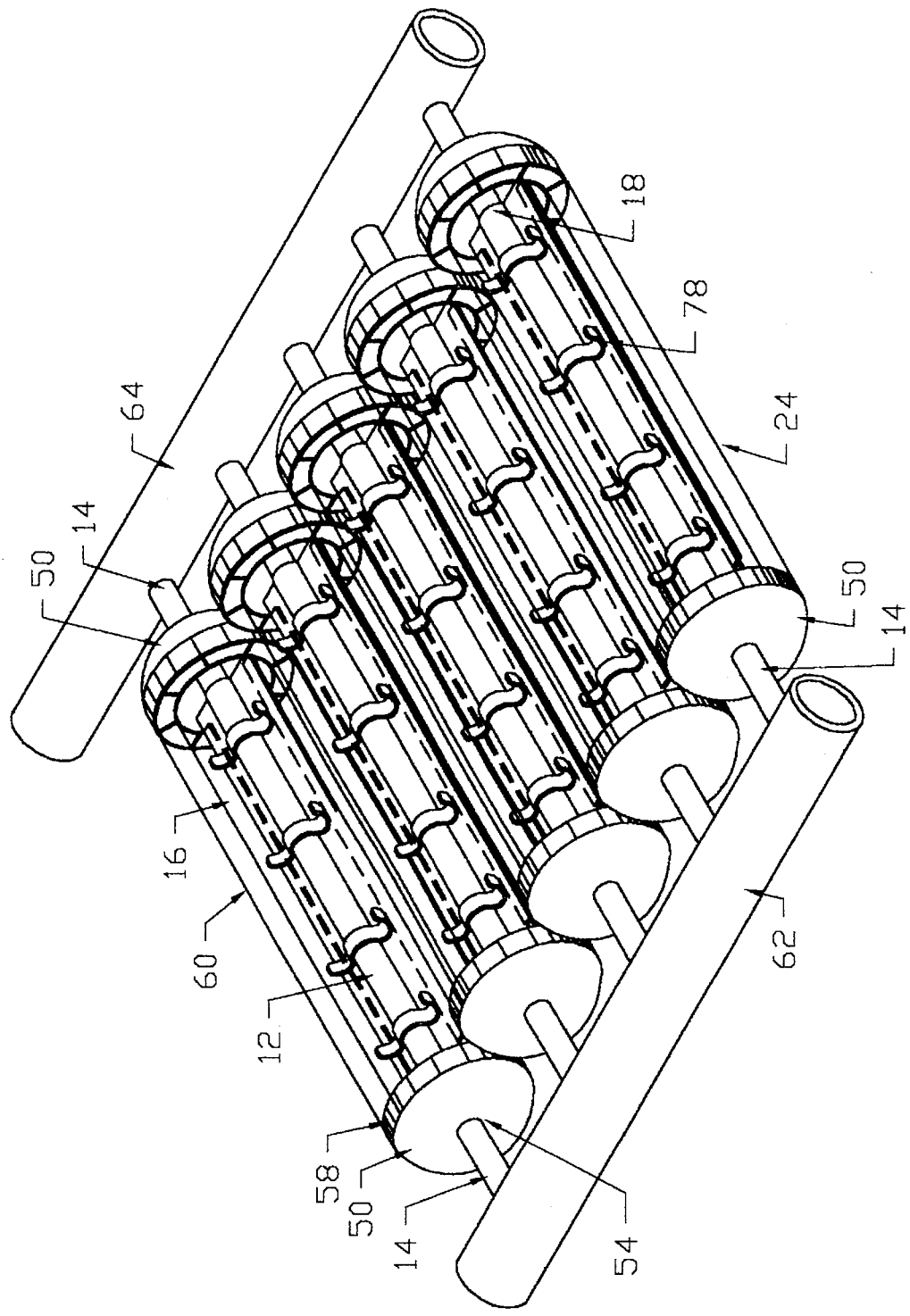
FIG. 1 is a perspective illustration of the preferred embodiment of the new and improved solar energy system constructed in accordance with the principles of the present invention.

Shown in FIG. 1 is a solar energy system having components comprising a heat absorber having a tubular conduit, the heat absorber also having a fin for supporting the conduit, the conduit and fin being fabricated of a dark color for collecting solar energy. Further provided is a housing surrounding the conduit, the housing including an axially disposed interior tube with a cross section greater than the cross section of the conduit, the housing also including a plurality of axially disposed exterior tubes, the interior tube and the exterior tube being fabricated of a transparent material. Further provided is at least one end cap coupled with respect to one end of the interior tube having at least one aperture in the end cap.

The present invention, the new and improved solar energy system 10 is a system comprised of a plurality of components. Such components in their broadest context include a heat absorber formed of a conduit and a fin, a casing or housing formed of an interior heat collecting tube, an exterior heat collecting tube, and radial spacers between the tubes to form axial segments. The individual components are specifically configured and correlated with respect to each other so as to attain the desired objectives.

The system 10 of the present invention has as its central component, a heat absorber 12. The heat absorber includes a tubular conduit 14 and a fin 16. The conduit is located in a linear path along at least a central portion of its extent. Such conduit 14 has a linear axis extending centrally therethrough at least in the central linear extent of its path.

The other component elements of the heat absorber 12 is the fin 16. The fin has a curved central section 18. The central section functions for supporting the conduit 14. The fin 16 also has end sections 20. The conduit and fin are fabricated of a dark color, preferably black. The selection of such color is for more efficiently collecting solar energy from the sun or other source of radiation and for transferring such energy to a fluid, preferably a liquid such as water, flowing through the conduit 14. The collecting is through the black body effect. The preferred material for the conduit 14 is plastic such as a polyamide or nylon. The conduit may also be copper or any other thermal conductor.

The next major component of the system 10 is a cylindrical casing or housing 24. The housing is preferably fabricated through extrusion. It is positioned with respect to the heat absorber 12 to surround the conduit 14, preferably located centrally therein. The cylindrical housing 24 includes an interior heat collecting tube 26. Such heat collecting tube has a cross section greater than the cross section of the conduit which it encases. The housing also includes an exterior heat collecting tube 28. Such exterior heat collecting tube has a cross section greater than the cross section of the interior tube 26. The exterior tube 28, interior tube 26 and tubular conduit 14 have a common linear axis.

The interior tube 26 has an interior cylindrical space 30 and an interior surface 32. Such surface is adapted to receive and support the end sections 34 of the fins. In addition, the interior tube and the exterior tube are fabricated of a transparent material. Such material is for the efficient receipt, transmission, entrapment and conducting of solar energy by the greenhouse effect.

The preferred material for the tube is a transparent plastic such as a poly-carbonate or lexan. Soda-lime glass is also a preferred material.

Located between the interior tube and exterior tube are radially positioned spacers 38. Such spacers are located along the length of the tubes between the tubes. Such spacers function to divide the space between the tubes into axial segments 40. In the preferred embodiment, the segments extend peripherally around the entire external surface 42 of the interior tube 26.

The material within the various segments is preferably a gas such as air locked in position by end caps secured over the ends of the segments. Other gases could be utilized such as nitrogen, argon and krypton.

The last component of the system 10 is a pair of end caps 50. Such end caps are coupled with respect to each end 52 of the conduit 14. Apertures 54 in the end caps allow for the passage of the conduit and its fluids therethrough. The end caps 50 have an interior face 56 for sealing the segments. They also have a cylindrical flange 58 adapted to be positioned over the exterior surface of the exterior tube adjacent to its end 52. At such location, the end caps are permanently secured with respect to the housing.

Figure 13:
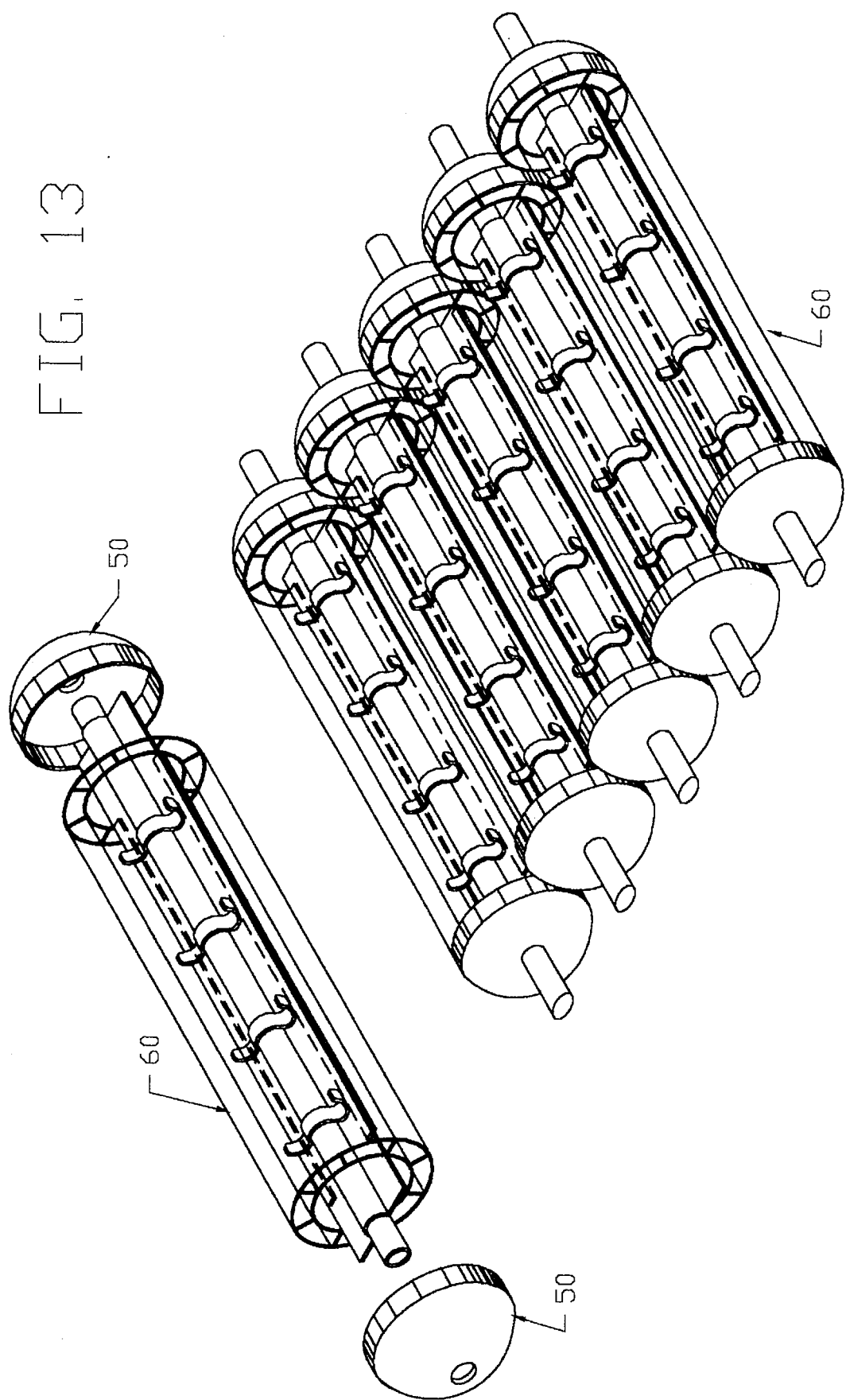
FIG. 13 is a perspective illustration of the system of FIG. 1 absent the header and footer and illustrating one of the components in an exploded configuration.

Each of the above described components 60, heat absorber 12, housing 24, spacers 38 and end caps 50 are adapted to be used together in a configuration of a system 10. When used together in a systems configuration, a plurality of such components 60 are located in a side by side relationship as shown in FIGS. 1, 13 and 14. The ends of the conduit 14 are in alignment at opposite ends of the system. The input ends of the elements are then joined together by manifolds. A manifold 62 on one end of the system functions as a header while a manifold 64 on the opposite side of the system functions as a footer. The header is for bringing fluid to be heated to the input ends of the parallel conduits while the footer couples the output ends of the conduits for the taking away of the heated fluid.

In the showing of FIGS. 2 and 3, the housing has its interior tube formed as a right circular cylinder. The exterior tube is similarly formed but with a greater diameter. Such tubes have a common length. In addition, the radial spacers are all of a common length and equally spaced to form eight segments of equal size around the periphery of the interior tube.

Figure 5:
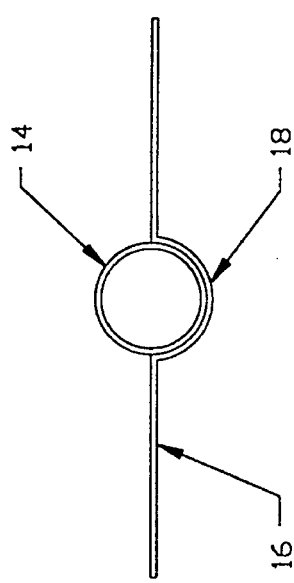
FIG. 5 is an end elevational view of the heat absorber shown in FIG. 4.
Figure 4:
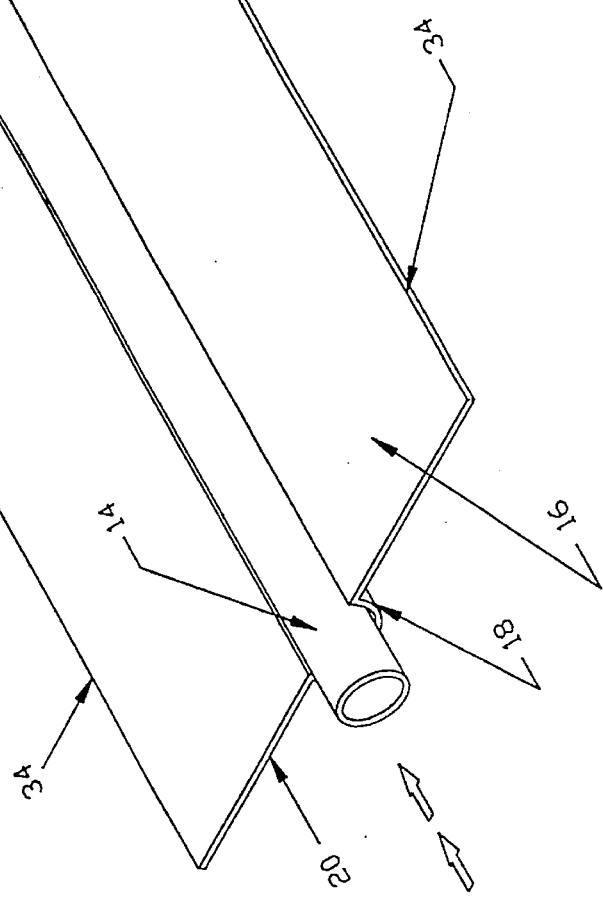
FIG. 4 is a perspective illustration of an alternate embodiment of a heat absorber for absorbing solar energy and for conveying fluid adapted for use in a system as shown in the system of FIG. 1.

FIGS. 4 and 5 shown the conduit in greater detail, as well as its supporting fin 16. The fin is linear over the majority of its extent except at a central section where it has a semicircular configuration for supporting the conduit.

FIGS. 1, 6 and 7 add clips 68. The clips are resilient curved members preferably formed of the same material and color as the other parts of the fin. They each have interior ends 70 secured to the fin near the conduit. They also have exterior curved ends 72 adapted to be in contact with the interior surface of the interior tube. The clips 68 function to further maintain the conduit at a central location in the space within the housing 24. A plurality of such clips are spaced along the length of the fin on the upper and lower surfaces thereof. Rivets 74 are shown to effect the coupling. A single rivet is attached to clips above and below the fin 16.

Figures 8, 9:
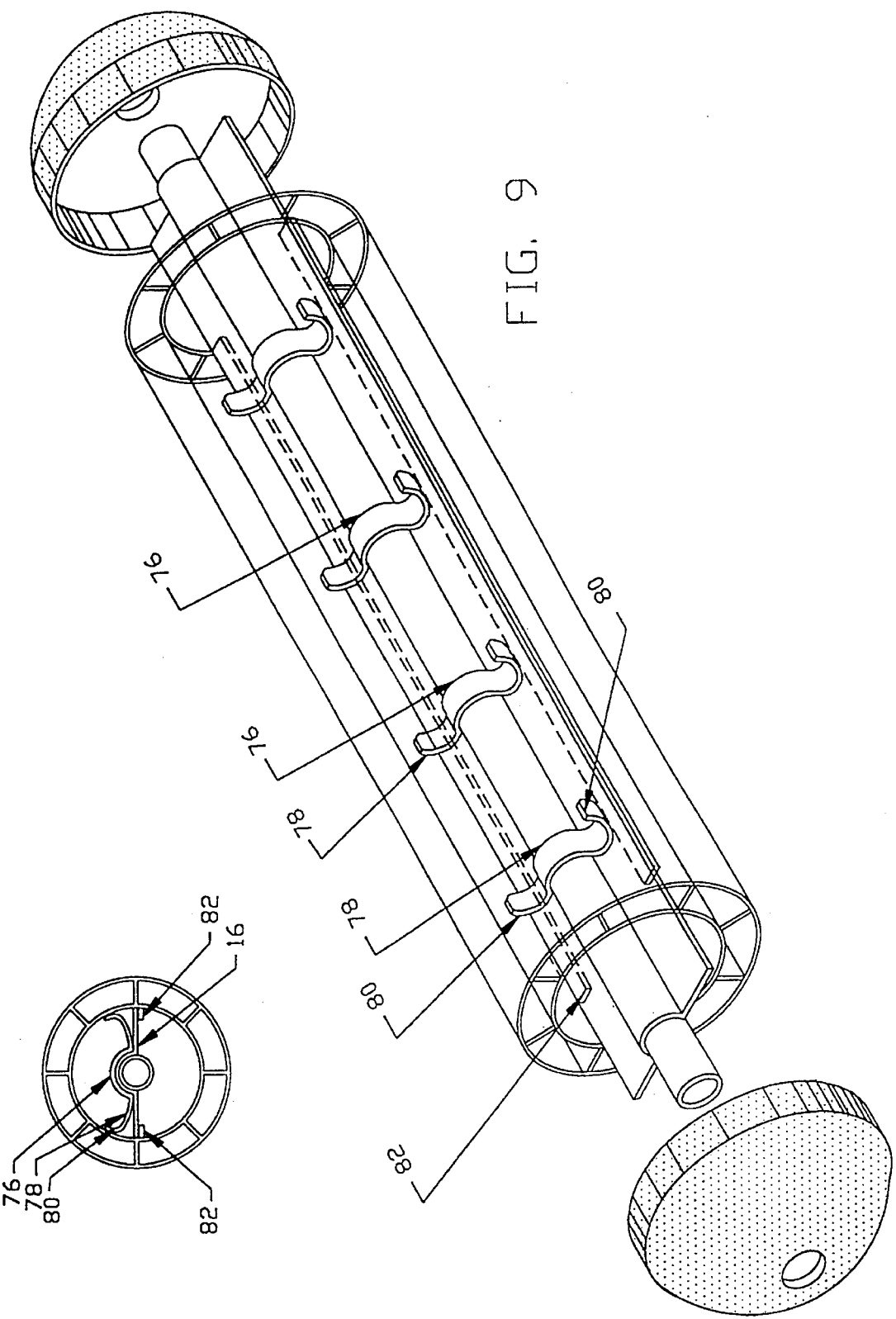
FIG. 8 is an exploded perspective view of an alternate embodiment of a component for use in the system of the type shown in FIG. 1.
FIG. 9 is an end elevational view of the absorber and housing shown in FIG. 8.

The embodiment of FIGS. 8 and 9 is similar to that shown in FIGS. 6 and 7. In such embodiment, however, the clips above the fin are eliminated. In its place, a plurality of single clips 78 are utilized along the length of the fin and therebeneath. The central section 76 of the clip is semi-circular in configuration to support on its upper surface the lower surface of the fin 16. Its outer ends 80 are curved to provide for a secure but removable coupling to the interior tube. This maintains the conduit centrally located within the housing. In addition, a pair of spaced parallel plates 82 extend along the length of the fin at its upper radially exterior ends. These are for providing added support.

The embodiment shown in FIGS. 10 and 11 is very similar to that shown in FIGS. 8 and 9. In such embodiment, however, a pair of clips 86 are provided. Such clips are of a similar construction of those shown in FIGS. 8 and 9. Such clips are used in pairs with the lower clip employed in the same manner as that shown in FIGS. 8 and 9. A similarly shaped clip is placed over the conduit in opposed force distributing relationship to the clip therebeneath. Together the clips function for the proper positioning of the conduit within the housing.

Figure 12:
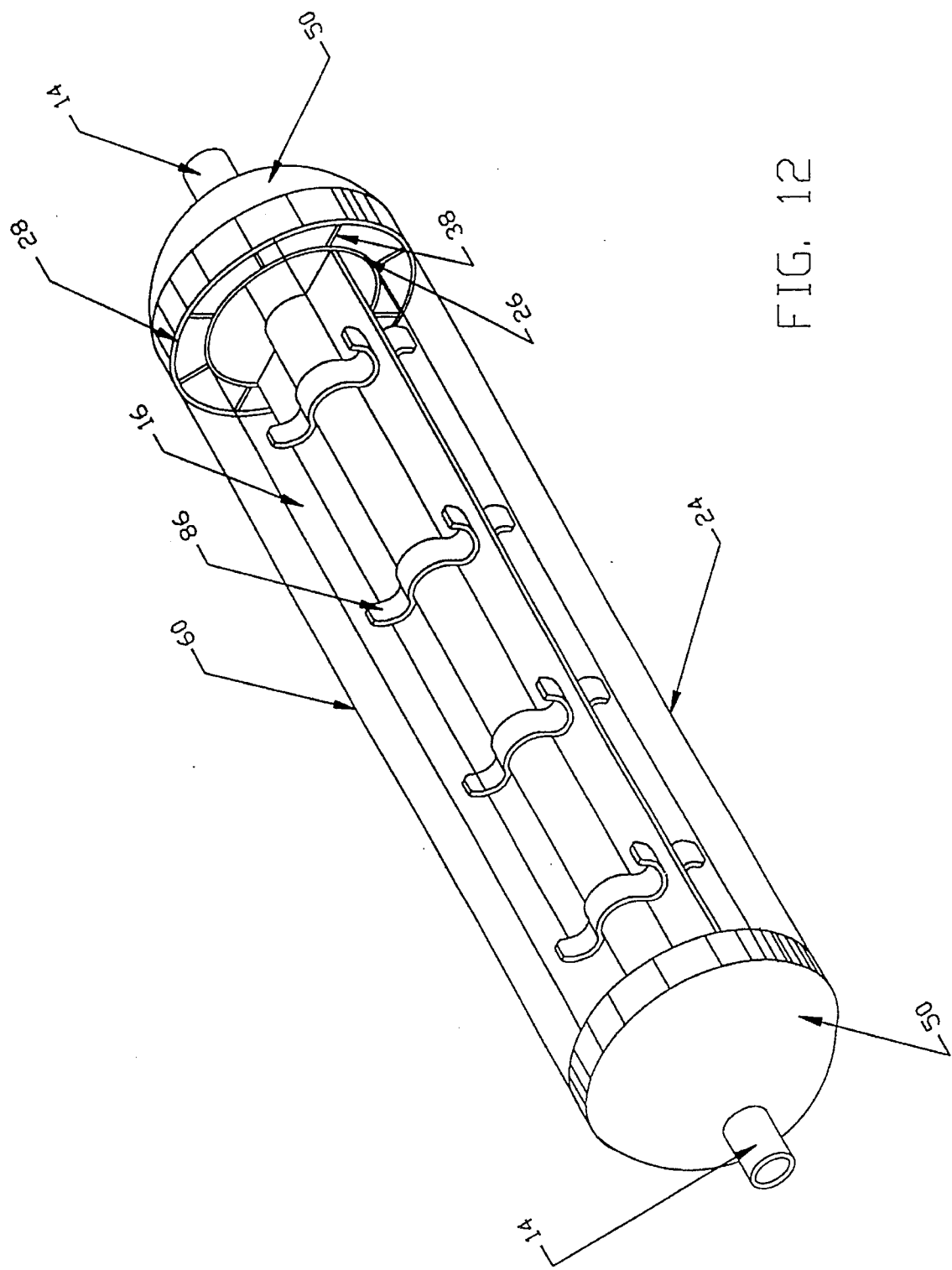
FIG. 12 is a perspective view of the component shown in FIGS. 10 and 11 but with the end caps attached.

FIG. 12 is a perspective view of a component 60 essentially the same as that shown in FIGS. 10 and 11. In such FIG. 12 showing, however, the end caps 50 are attached to show a completed component 60 including a heat absorber with conduit 14, a fin 16 and clips 86 as well as a housing with interior tube 26 and exterior tube 28 having spacers 38 between the tubes and also including end caps 50.

FIG. 13 is an exploded perspective view of a plurality of elements or components 60 of the type shown in FIGS. 10, 11 and 12. In such showing, however, five elements are shown in side by side relationship for being coupled together through a header 62 and footer 64 of the type shown in FIG. 1. The upper most element, however, is shown exploded with the end caps 50 removed to illustrate further internal constructions thereof.

FIG. 14 is a view similar to FIG. 13. In such view, however, the header and footer are shown. The header is coupled to the conduits at their upper locations. Such ends of the conduits are the fluid input ends 90. The header is a manifold with a plurality of apertures 92 equally spaced along the length thereof for receiving the input ends of the conduits of the plurality of elements of the system. The footer 64 at the lower end of the FIG. 14 is shown as exploded, spaced from the output ends of the conduits. The footer is of a similar construction as the header with apertures for coupling with the output ends 94 of the conduit. As such, fluid can enter the header from one end, pass to the plurality of input ends of the conduit, through the plurality of conduits and then into the footer 94 for passage to remote therefrom. Note the direction of the arrows indicating the direction of the flow of fluids.

In the embodiments shown in FIGS. 15, 16 and 17, the housing is formed in a rectangular configuration. The interior heat collecting tube 96 is rectangular in cross section, preferably a square. Similarly, the exterior heat collecting tube 98 is also formed as a rectangle, preferably a square. The conduit 14 is located centrally within the space 30 defined by the interior tube. The space between the interior and exterior tubes is of a common thickness. Further, the radial spacers are shown as horizontal spacers 100 between the vertical segments 102 of the interior and exterior tubes. The spacers 106 are shown as spacers components between the interior and exterior tubes above and below the conduit. The horizontal segments 104 are between the vertical spacers 106. The horizontal spacers are spaced to make square segments 102 to the sides of the conduit. The segments 104 above and below the conduit have their spacers 106 such that the segments are rectangular in configuration and of a larger area than the remaining segments 102.

The fins 16 are as in the prior embodiment of a one piece construction with horizontal segments and a central semi-circular extent 114 for supporting the conduit 14. In addition, clips 116 are provided with a semi-circular cross section 118 in the center thereof and with curved ends 120 in contact with the interior surface of the interior tube at their corners. Such clips are located at spaced locations along the length of the fin and conduit, one beneath the fin with the other aligned therewith above the conduit.

The embodiment shown in FIGS. 18, 19 and 20 is similar to that shown in FIGS. 15, 16 and 17. In such embodiment, however, a plurality of components 60 are formed by a common extrusion. Further, radial spacers are not included between adjacent components. In place thereof a common vertical wall 124 separates the components one from an other as its separates the spaces 126 surrounding the various conduits and their associated fins. Horizontal segments 128 above and below the conduit are essentially the same as in the embodiment of FIGS. 15, 16 and 17. Similarly, the radial spacers 129 and axial segments 130 to the sides of the various components are only at the extreme most components. In this manner, the end most components 131 are of a different construction then the centrally disposed components 132 between the end most components 131. In this embodiment, the interior tubes do not all have individual segments totally therearound. Instead, the next adjacent interior tube functions as its adjacent segments.

The embodiment shown in FIGS. 21, 22 and 23 is similar to the embodiment of FIGS. 18, 19 and 20. Such embodiment is best seen in the exploded view of FIG. 24. In such embodiment, the spacers and segments to the lateral sides of the elements are eliminated as are the spacers and segments therebeneath. In place thereof, a channel 138 of corrugated material is employed for thermal insulation. Such channel includes a lower horizontal section 140 and side sections 142 formed of a common material such as corrugated cardboard. The bottom most face 144 of the extruded grouping of components 146 rests on the upper surface of the lower most section of the channel 138 while the lateral sides 148 are in contact with the interior faces of the upstanding side sections 142 of the channel. A panel 150 of extruded radial spacers 152 and segments 154 is formed with the vertical walls 124 of the components 60 which contain the conduits and fins. The extruded components 60 and panel 150 are extruded together and placed within the channel 138. Lower insulating strips 156 are located at the upper edges of the channel in contact with the lower surface of the panel 105. Upper insulating strips 158 are located above the upper edges of the panel 150. Thereabove is placed a L-shaped securement member 160 for holding together the various elements of the system.

The embodiment of FIGS. 25, 26 and 27 is similar to that shown in FIGS. 21 through 24. In such embodiment, however, the panel 150 of spacers and segments is eliminated. Instead, for each component 60, the next adjacent contacting component 60 functions as a segment for effecting the transfer and retention of heat as in the prior embodiments.

Figure 24:
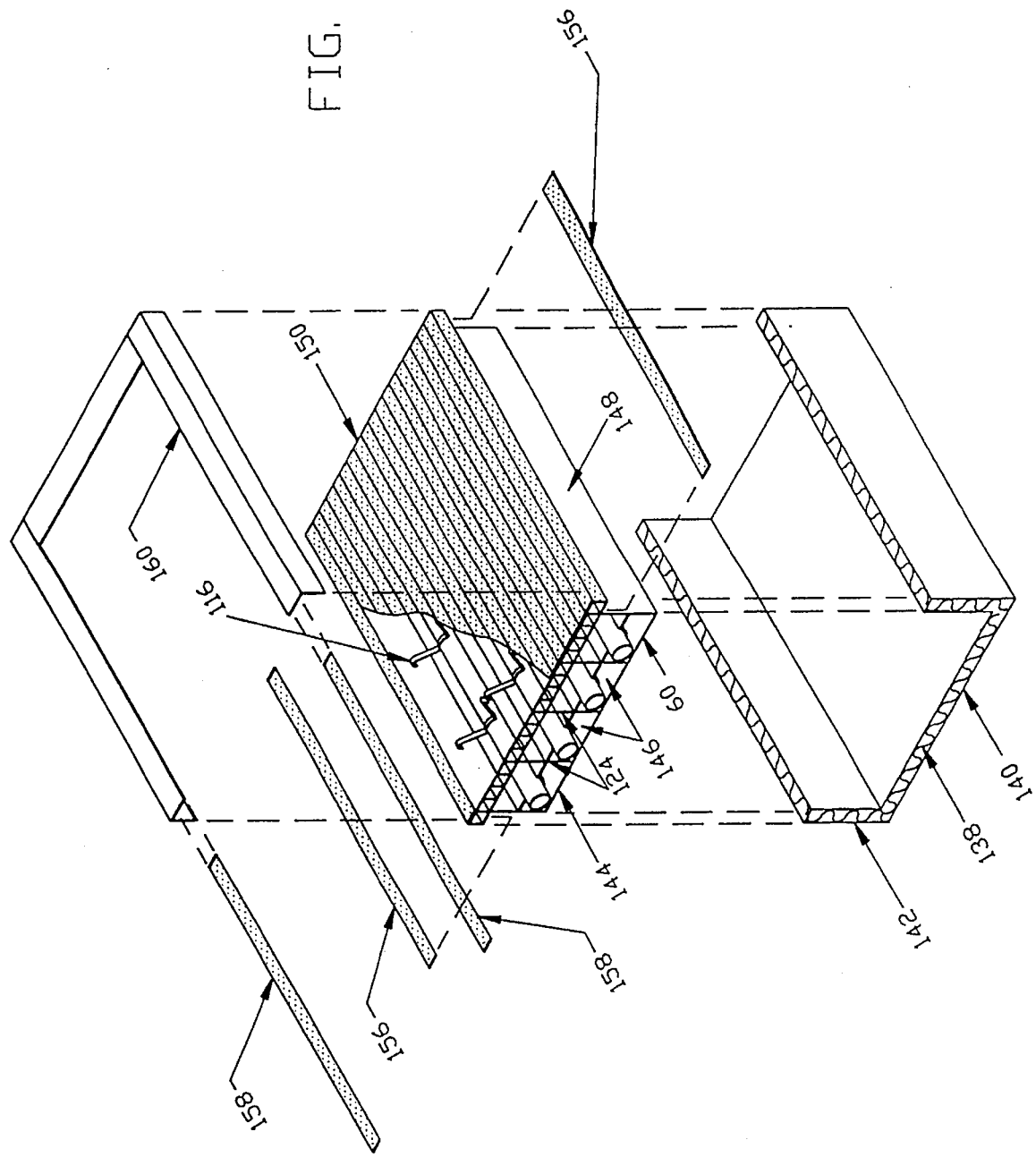
FIG. 24 is an exploded perspective view of the system shown in FIG. 21.
Figure 28:
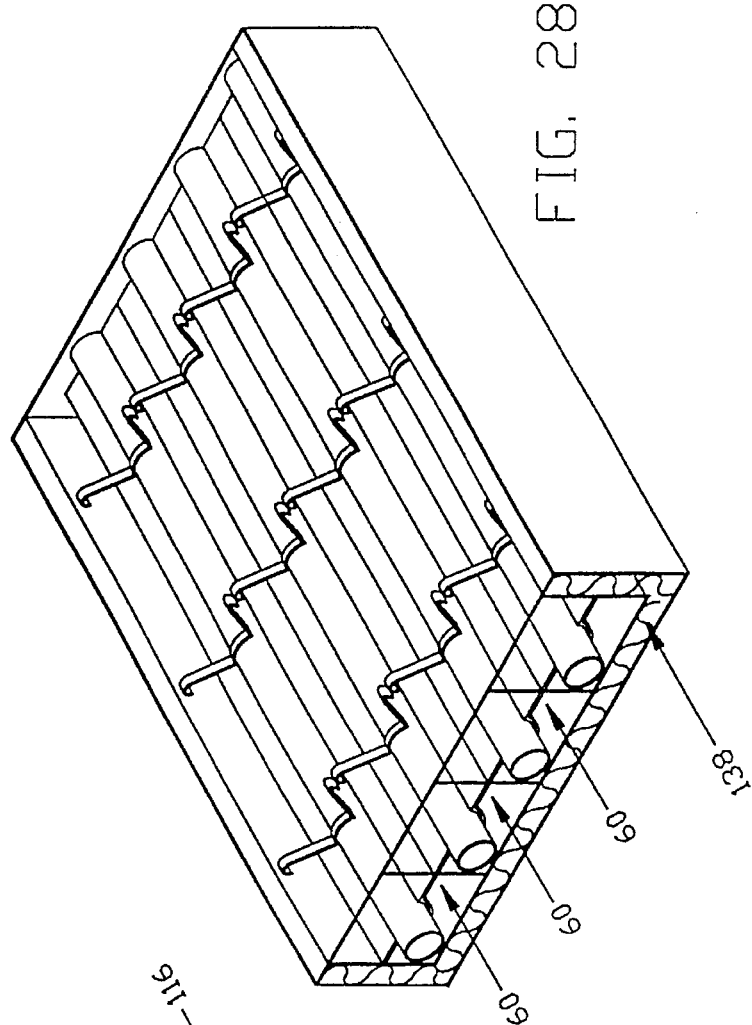
FIG. 28 is a perspective illustration of components of an alternate embodiment of the invention for use in a system of the type shown in FIG. 1.
Figure 29:
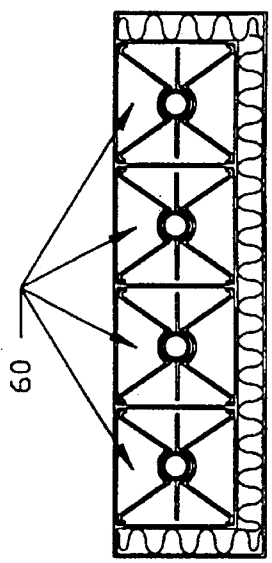
FIG. 29 is an end elevational view of the components as illustrated in FIG. 28.
Figure 30:
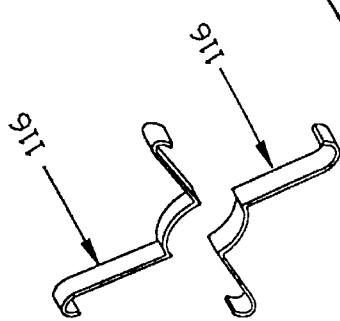
FIG. 30 is an exploded perspective view of the clips utilized in association with the absorber shown in FIGS. 28 and 29.
Figure 36:
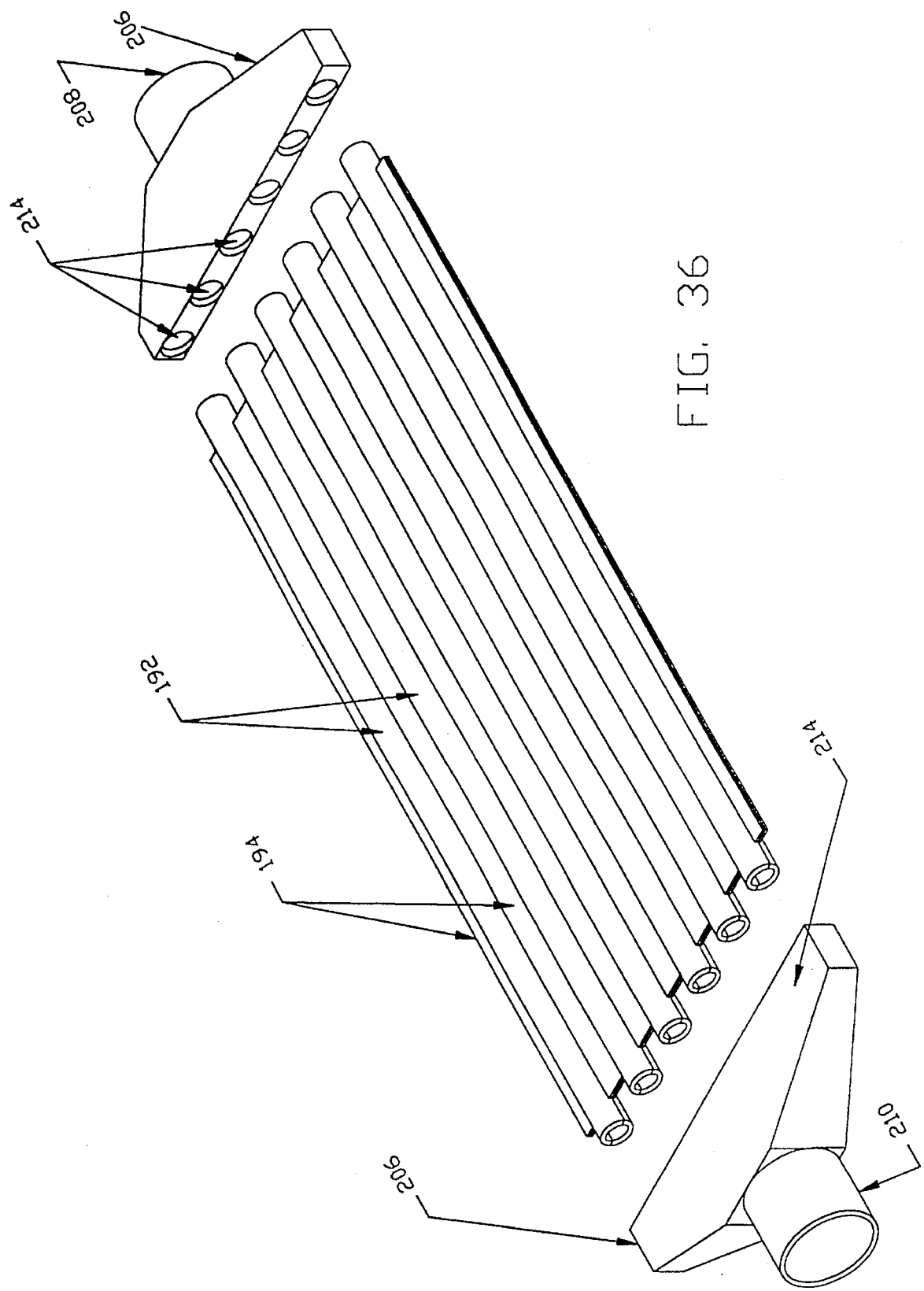
FIG. 36 is an exploded perspective view of the heat absorber shown in FIGS. 33, 34 and 35.

The embodiment of FIGS. 28, 29 and 30 is similar to that shown in FIG. 25. In such embodiment, however, the single extruded grouping of components 60 is placed within an insulating channel 138 of corrugated material as shown in FIGS. 21, 22 and 24.

FIG. 31 is a perspective illustration of an alternate embodiment of the heat absorber. In such embodiment, the conduit 14 is as in the prior embodiments. The fin 164, however, is formed with undulations 166 forming teeth 168 in generally V-shaped configurations. In such embodiment, the surface 170 for absorbing solar energy is increased to increase the overall efficiency of the system.

In the embodiment shown in FIGS. 33 through 36, a plurality of conduits 192 are supported on a common fin 194. The conduits and fins are formed together as a unitary device 196. Such device has a lower extent 198 and a similarly shaped upper extent 200. Each upper and lower extent has linear sections 202 and semi-circular curve sections 204 therebetween. When placed together with the linear sections in contact, the semi-circular sections will mate to form the conduits 192, spaced one from another, along the length of the device. The end caps 206 are formed as manifolds. Each end cap has a tube one being the input tube 208, one being the output tube 210. Each end cap is also provided with a plurality of apertures 212 for coupling with the conduits. A mixing chamber 214 is located in the central extent of each end cap 206. Each grouping of components 60 is positioned within a rectangular tube 216 as in the prior embodiment. Note FIG. 35.

Figure 39:
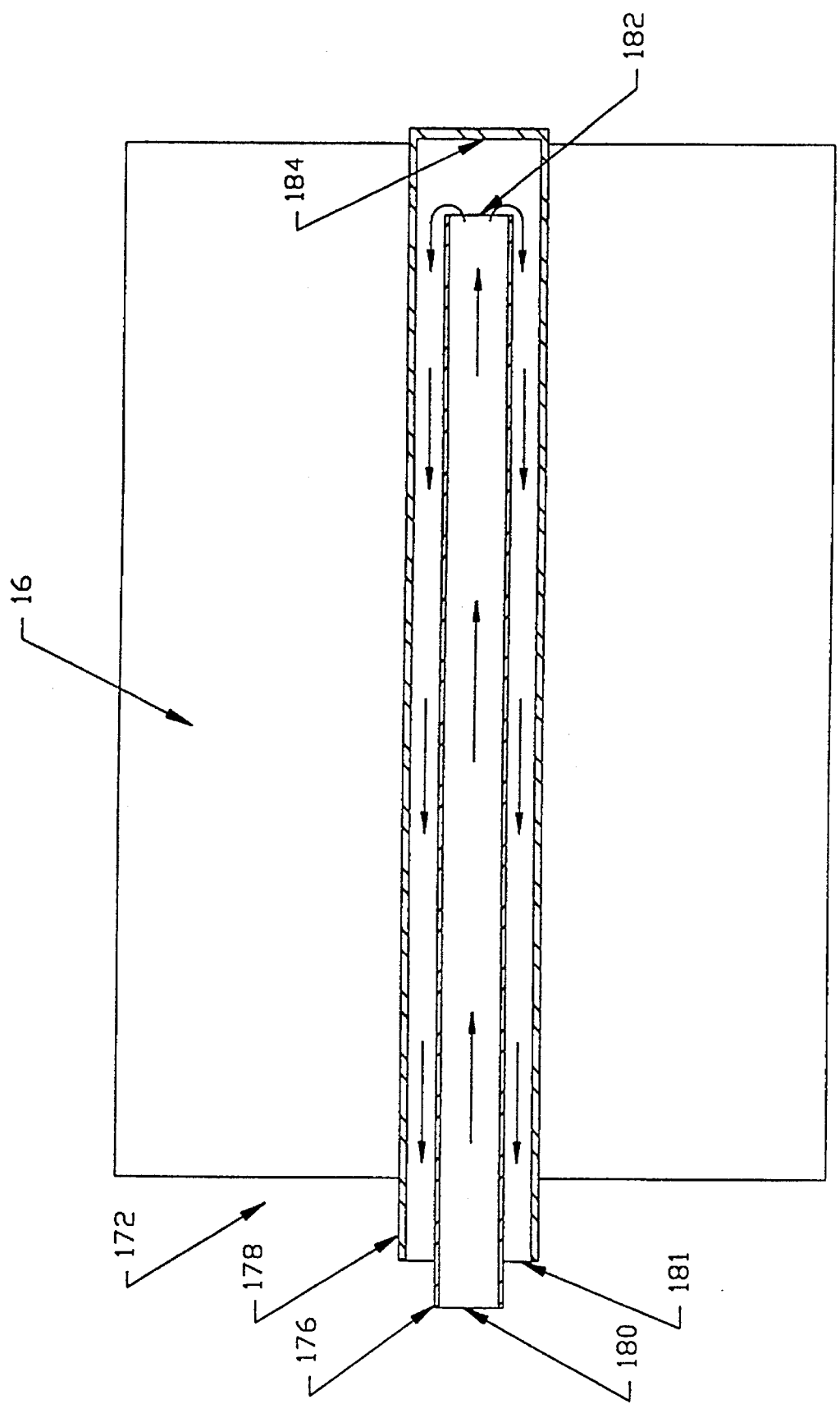
FIG. 39 is a cross sectional view of the heat absorber shown in FIG. 33.

The embodiment shown in FIGS. 37, 38 and 39 illustrate a heat absorber 172. Such heat absorber includes a fin 16 similar to that in several of the prior Figures. The conduit 174, however, has an interior conduit 176 and an exterior conduit 178. Such conduits have free ends 180 and 181 exterior of the element for coupling as with a header and a footer. Interior of the element, however, the interior tube is spaced from the exterior tube. The interior tube has an open end 182 while the exterior tube has a closed end 184. In this manner, fluid to be heated may be fed into the interior tube and, at the interior end thereof, it reverses direction to leave the conduit at the same end from which it was received. This is because the end 184 is a closed end while the adjacent end 182 is an open end. Note the direction of the arrows.

FIGS. 40 and 41 show an embodiment where the conduit 188 is formed in a U-shaped configuration. It has an input end 190 and an output end 192 and a semi-circular portion 194 therebetween. In such embodiment, the fin 196 is formed as in the prior embodiments with central extents 198 but with a pair of semi-circular recesses for supporting the linear segments of the conduit.

FIGS. 42 and 43 show an embodiment similar to FIGS. 40 and 41 except that there are no semi-circular recesses in the fin 202. The fin is totally planar with the tube 188 resting totally thereon including the linear segment and the curved segment 194 therebetween.

Figure 44:
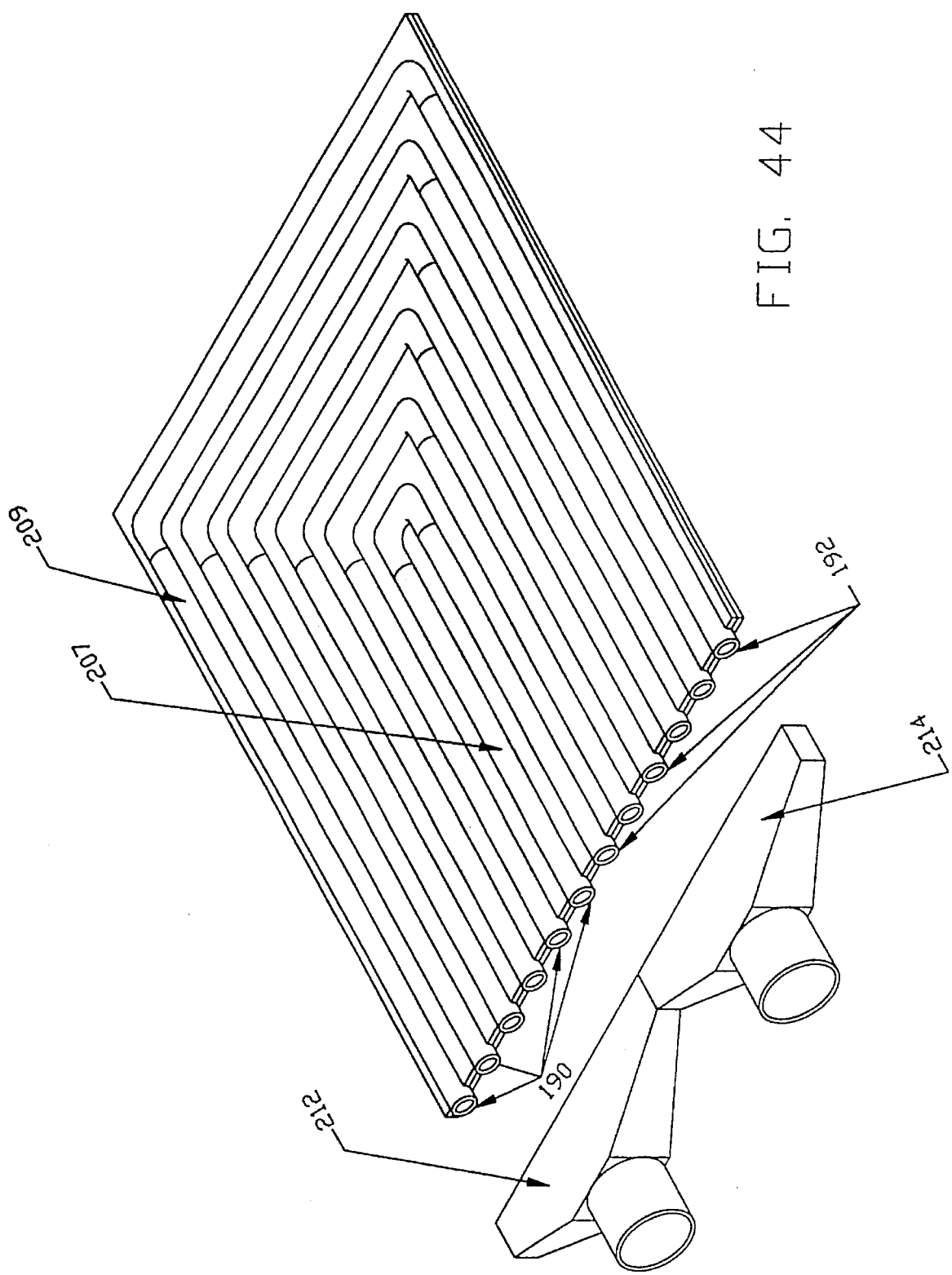
FIGS. 44 and 45 are an exploded view and a perspective view of an alternate embodiment of a curved conduit.
Figure 45:
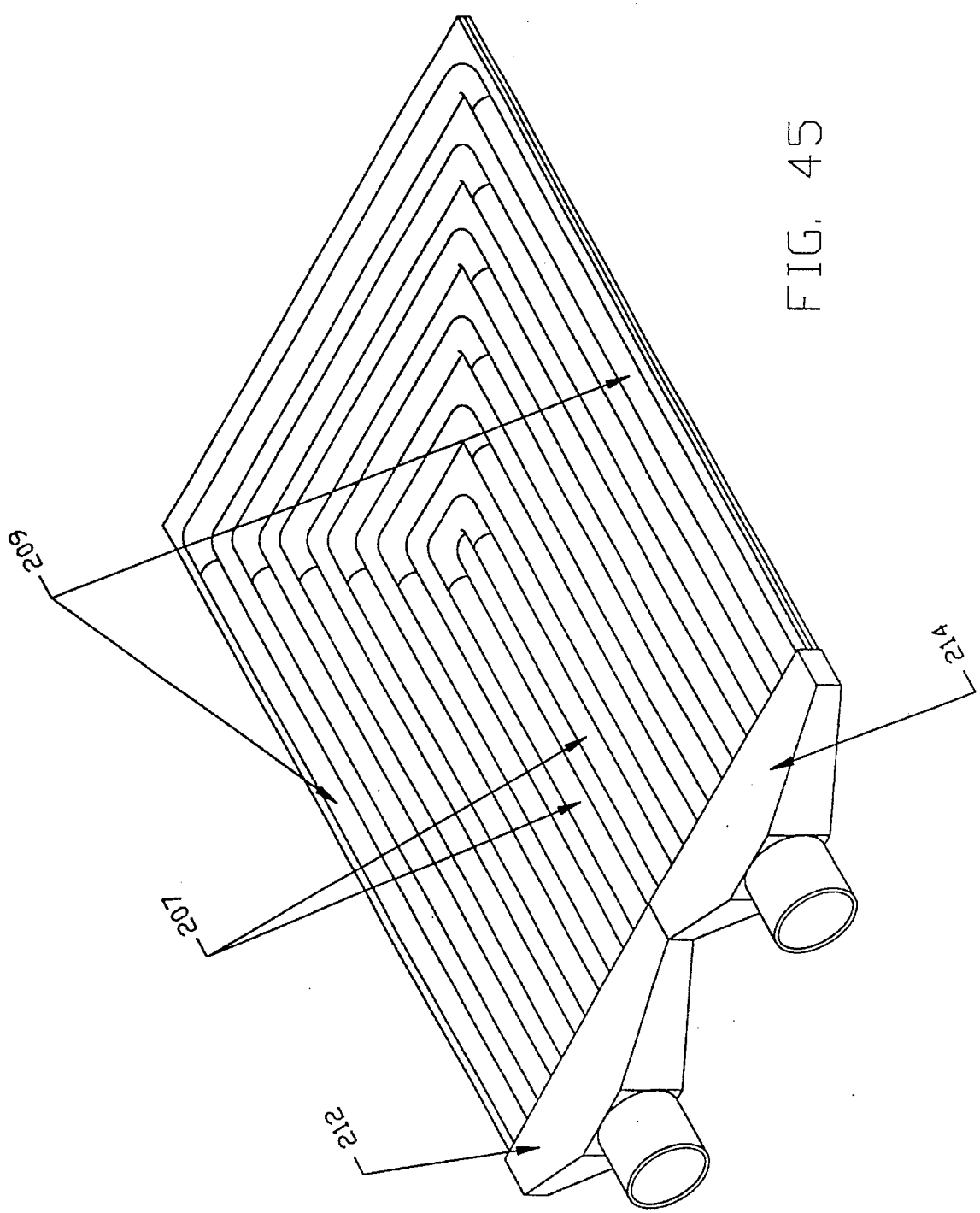

FIGS. 44 and 45 show a variation of the curved conduit. In such embodiments, the conduits are formed in U-shaped configurations with the smallest conduit 207 and the largest conduit 209 most exteriorly thereof. Any number of additional conduits of increasing size may be utilized. In this embodiment, the conduits and fins are formed together as in the illustration of FIGS. 40 through 43. In this embodiment, the header 212 and footer 214 are formed on the same side of the system. FIGS. 46, 47 and 48 are a side view of the system of FIG. 45 while FIGS. 47 and 48 are end views of the conduits and end caps. All of the input ends 190 are together and coupled to the header 212 while the output ends 192 are also together and coupled to the footer 214. Further, each grouping of components 60 is positioned within a rectangular tube 216 as in the prior embodiment. Note FIG. 48.

The next embodiment, that of FIGS. 49 through 51 show the conduit 218 formed with a common header 220. The fluid moving through the header will be allowed to move through a depending closed tube conduit 218 functioning as the conduit of the prior embodiment. The material in the gaseous state will form in the depending tube. Radiation will strike the lower end of the tube through interior and exterior heat collecting tubes as in the prior embodiments. The radiation converts the gas into a liquid at the bottom of the conduit 218. Evaporation rises within the conduit from the liquid while condensation forms on the inner surface of the conduit to fall down into the conduit. The fluid to be heated in gaseous form is fed through the header 220 during normal operation and use.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,
What is claimed is:

1. A new and improved solar energy system, formed from a plurality of components, each component comprising, in combination:

a heat absorber having a tubular conduit located in a linear path along at least a central portion of its extent, the tubular conduit having a linear axis extending therethrough, the heat absorber also having a fin along the length of the conduit with end sections and a central section therebetween for supporting the conduit, the conduit and fin being fabricated of a dark color for collecting solar energy from the sun and transferring such solar energy by the black body effect to a liquid flowing through the conduit;

an extruded housing of a cylindrical configuration throughout its entire length surrounding the conduit, the cylindrical housing including an interior heat collecting tube with a cross section greater than the cross section of the conduit, the housing also including an exterior heat collecting tube with a cross section greater than the cross section of the interior tube with the exterior tube and the interior tube and the tubular conduit all having a common axis, the interior tube having an interior surface contacting and supporting the end sections of the fin, the interior tube and the exterior tube being fabricated of a transparent material for the receipt and entrapment of solar energy by the greenhouse effect;

radial spacers located between the interior tube and the exterior tube along the lengths thereof to divide the space between the tubes into axial segments; and a plurality of end caps, each end cap coupled with respect to one end of the conduit with an aperture formed in each end cap for the passage of the conduit therethrough.

2. A solar energy system having a component comprising:

a heat absorber having a tubular conduit, the heat absorber also having a fin with a central section for supporting the conduit and end sections, the conduit and fin being fabricated of a dark color for collecting solar energy;

a housing surrounding the conduit and an interior surface contacting the end sections for the support thereof, the housing including an axially disposed interior member with a cross section greater than the cross section of the conduit, the housing also including a plurality of separate exterior members, each such exterior member being axially disposed with respect to the interior member, the interior member and the exterior members being fabricated of a transparent material; and at least one end cap coupled with respect to one end of the interior tube having at least one aperture in the end cap.

3. The system as set forth in claim 2 wherein the interior member has a circular cross sectional configuration, the exterior member has a circular cross sectional configuration and, further including radial spacers between the interior member and the exterior member to divide the space therebetween into axial segments.

4. The system as set forth in claim 2 and further including clips coupling the fin to the interior surface of the interior member for the central positioning of the conduit within the housing.

5. The system as set forth in claim 4 wherein the clips are short members with interior ends secured to the fin and, exterior ends curved and in contact with the interior surface of the housing, 6. The system as set forth in claim 4 wherein the clips have central curved regions positionable beneath the conduit and fin and curved exterior ends in contact with the interior surface of the housing, 7. The system as set forth in claim 6 and further including supplemental clips with central curved regions positionable above the conduit and curved exterior ends located in contact with the interior surface of the housing, 8. The system as set forth in claim 2 and further including a header manifold coupling a plurality of conduits at their input ends and a footer manifold with apertures coupling a plurality of conduits at their output ends.

9. The system as set forth in claim 2 wherein the interior member is of a rectangular configuration and the exterior member is of a rectangular configuration.

10. The system as set forth in claim 9 and further including spacers to divide the area between the members into rectangular segments.

11. The system as set forth in claim 9 wherein the region between adjacent members is a vertical wall.

12. The system as set forth in claim 11 and further including at least one panel of segments adjacent to one surface of the members.

13. The system as set forth in claim 9 and further including a U-shaped channel formed of corrugated material for the receipt of a plurality of components extruded together as a single member.

14. The system as set forth in claim 2 wherein the fin is formed with corrugation for increased surface area.

15. The system as set forth in claim 2 wherein a plurality of conduits and their associated fins are fabricated of extruded facing components of similar configurations secured together along a common parting line between the fins and tubes.

16. The system as set forth in claim 2 wherein the conduit includes an interior conduit and an exterior conduit for the passage of fluid in opposite directions to allow input and output at a common end of the conduit.

17. The system as set forth in claim 2 wherein the conduit is in a U-shaped configuration for allowing the input and output of the conduit to be at a common end of the tube.

18. The system for as set forth in claim 17 wherein a plurality of U-shaped conduits are coupled together in a common plane with an input header for the input ends of the conduits and an output header for the output ends of the conduits.

19. The system as set forth in claim 2 wherein the conduit is a tubular condensers.

* * * * *